United States Patent
Hirsch et al.

(10) Patent No.: US 12,370,020 B2
(45) Date of Patent: Jul. 29, 2025

(54) INDIRECT BONDING TRAY FOR BONDING ORTHODONTIC APPLIANCES AND METHODS OF MAKING AND USING THE SAME

(71) Applicant: SOLVENTUM INTELLECTUAL PROPERTIES COMPANY, Maplewood, MN (US)

(72) Inventors: Mitchell A. Hirsch, Woodbury, MN (US); Daniel J. Skamser, Ham Lake, MN (US); David K. Cinader, Jr., Woodbury, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 361 days.

(21) Appl. No.: 17/919,302

(22) PCT Filed: Apr. 16, 2021

(86) PCT No.: PCT/IB2021/053168
§ 371 (c)(1),
(2) Date: Oct. 17, 2022

(87) PCT Pub. No.: WO2021/214613
PCT Pub. Date: Oct. 28, 2021

(65) Prior Publication Data
US 2023/0157792 A1    May 25, 2023

Related U.S. Application Data

(60) Provisional application No. 63/015,121, filed on Apr. 24, 2020.

(51) Int. Cl.
*A61C 7/14* (2006.01)
*A61C 9/00* (2006.01)

(52) U.S. Cl.
CPC ............ *A61C 7/146* (2013.01); *A61C 9/0053* (2013.01)

(58) Field of Classification Search
CPC .............................. A61C 7/146; A61C 9/0053
See application file for complete search history.

(56) References Cited

U.S. PATENT DOCUMENTS

| 4,183,141 | A | * | 1/1980 | Dellinger | ............... A61C 7/146 433/24 |
| 4,672,032 | A | | 6/1987 | Harold et al. | |
| 5,204,055 | A | | 4/1993 | Sachs et al. | |

(Continued)

FOREIGN PATENT DOCUMENTS

| EP | 2266494 A1 | 12/2010 |
| EP | 2931166 B1 | 10/2019 |

(Continued)

OTHER PUBLICATIONS

International Search Report for PCT Application No. PCT/IB2021/053168, mailed on Jun. 29, 2021, 7 pages.

*Primary Examiner* — Ralph A Lewis

(57) ABSTRACT

Trays for indirect bonding orthodontic appliances to a patient's teeth and methods of bonding orthodontic appliances to patient's teeth, using a custom patient-specific mold body that optimizes the placement of the orthodontic appliances on the patient's teeth. Method of designing such trays for indirect bonding orthodontic appliances are also included.

19 Claims, 14 Drawing Sheets

(56) References Cited

U.S. PATENT DOCUMENTS

| | | | |
|---|---|---|---|
| 5,340,656 A | 8/1994 | Sachs et al. | |
| 5,387,380 A | 2/1995 | Cima et al. | |
| 5,490,882 A | 2/1996 | Sachs et al. | |
| 5,490,962 A | 2/1996 | Cima et al. | |
| 5,518,680 A | 5/1996 | Cima et al. | |
| 5,700,289 A | 12/1997 | Arnold et al. | |
| 5,791,896 A * | 8/1998 | Ipenburg | A61C 7/12 433/24 |
| 5,971,754 A | 10/1999 | Sondhi et al. | |
| 6,123,544 A * | 9/2000 | Cleary | A61C 7/146 433/74 |
| 6,739,869 B1 | 5/2004 | Taub et al. | |
| 7,210,929 B2 | 5/2007 | Raby et al. | |
| 7,291,011 B2 | 11/2007 | Stark et al. | |
| 7,354,268 B2 | 4/2008 | Raby et al. | |
| 7,869,983 B2 | 1/2011 | Raby et al. | |
| 7,940,258 B2 | 5/2011 | Stark et al. | |
| 7,993,133 B2 | 8/2011 | Cinader, Jr. et al. | |
| 8,517,727 B2 | 8/2013 | Raby et al. | |
| 9,763,750 B2 | 9/2017 | Kim et al. | |
| 2004/0157184 A1 | 8/2004 | Reising | |
| 2008/0233528 A1 | 9/2008 | Kim et al. | |
| 2010/0092904 A1 * | 4/2010 | Esposti | A61C 7/146 700/98 |
| 2016/0166357 A1 | 6/2016 | Portalupi | |
| 2017/0105816 A1 | 4/2017 | Ward | |
| 2018/0161126 A1 * | 6/2018 | Marshall | A61C 7/146 |
| 2019/0343606 A1 * | 11/2019 | Wu | A61C 7/146 |
| 2021/0386523 A1 * | 12/2021 | Raby | B33Y 70/00 |
| 2023/0157792 A1 * | 5/2023 | Hirsch | A61C 7/146 433/24 |
| 2024/0008959 A1 * | 1/2024 | Paehl | A61C 7/08 |

FOREIGN PATENT DOCUMENTS

| | | |
|---|---|---|
| WO | 2001080761 A2 | 11/2001 |
| WO | 2021105878 A1 | 6/2021 |

* cited by examiner

INDIRECT BONDING TRAY FOR BONDING ORTHODONTIC APPLIANCES AND METHODS OF MAKING AND USING THE SAME

CROSS REFERENCE TO RELATED APPLICATIONS

This application is a national stage filing under 35 U.S.C. 371 of PCT/IB2021/053168, filed Apr. 16, 2021, which claims the benefit of U.S. Provisional Application No. 63/015,121, filed Apr. 24, 2020, the disclosures of which are incorporated by reference in their entireties herein.

BACKGROUND

Orthodontic appliances such as brackets are used in orthodontic treatments for moving one or more teeth from an initial position (sometimes referred to as malposition or malocclusion) to a desired position in a patient's dentition. For example, by using an orthodontic treatment the patient's tooth may be moved such that their labial sides are aligned with each other to achieve or maximize an aesthetically pleasant appearance of the overall dentition. Further in some cases, one or more teeth may be moved to correct a malocclusion. The movement of teeth is typically achieved by a pre-biased elastic arch wire, which is attached via brackets to the teeth, and which applies a force to the teeth toward the desired position over a longer time period. The ends of orthodontic arch wires are often connected to small appliances known as buccal tubes that are, in turn, secured to the patient's molar teeth. In many instances, a set of brackets, buccal tubes and an arch wire is provided for each of the upper and lower dental arches of the patient.

In many types of orthodontic techniques, the precise position of the orthodontic appliances on the teeth is an important factor for helping to ensure that the teeth move to their intended final positions. For example, one common type of orthodontic treatment technique is known as the "straight-wire" technique, where the arch wire lies in a horizontal plane at the conclusion of treatment. If, for example, a bracket is attached to the tooth at a location that is too close to the occlusal or outer tip of the tooth, the orthodontist using a straight-wire technique will likely find that the tooth in its final position is unduly intruded. On the other hand, if the bracket is attached to the tooth at a location closer to the gingiva than is appropriate, it is likely that the final position of the tooth will be more extruded than desired.

Certain treatment planning systems have been used to determine the desired position of the teeth in a computer simulation in advance of any actual treatment. Such a planning system helps for example for avoiding collisions between the teeth and brackets in tooth positions outside the initial position, and further allows for the brackets and the arch wire to be designed and arranged to match with a variety of clinical situations, for example with the position of the teeth in the initial position, in the desired position, and positions between. For lingual brackets, such treatment planning is widely used. Lingual brackets often have a customized design individually for every tooth and patient because, other than the labial surfaces of a tooth, the lingual surfaces greatly vary in shape relative to each other so that a "one size fits all" bracket shape typically cannot be used. Some treatment planning systems also allow for designing such customized brackets which precisely match a tooth surface and the required clinical situations of a patient. Accordingly, customized brackets typically have to be precisely placed at positions on the teeth which are predetermined during the treatment planning For facilitating a precise placement of the brackets on a patient's teeth and for the orthodontist's reference, the brackets are often provided prepositioned on a plaster model replicating the patient's teeth. One example of a treatment planning software is disclosed in PCT Publication WO 2001/80761 "Interactive Orthodontic Care System Based on Intra-oral Scanning of Teeth." As disclosed, the treatment planning software virtually superimposes brackets on teeth to generate a three-dimensional model comprising the three-dimensional tooth objects plus the virtual brackets at their intended locations. This three-dimensional model is supplied to a stereolithography (SLA) instrument for additive manufacturing a plastic model of the teeth with the brackets superimposed thereon. A thermoplastic foil is placed above the SLA model and the model and foil are placed within a pressure chamber. The chamber is pressurized so that the foil envelops the dentition and the brackets. The foil thus obtains small indentations where the brackets can be located. Other examples of treatment planning software are disclosed in the following U.S. Pat. Nos. 7,940,258; 7,869,983; 7,291,011; 7,354,268; 7,993,133; 8,517,727

A plaster model on which the brackets are placed is sometimes used in orthodontics to make a so-called "transfer tray" for facilitating the placement of the bracket on a patient's teeth. A transfer tray typically is adapted to hold a complete set of brackets at the predetermined position and allow the brackets to be placed and bonded on the teeth all at once, in one step, by a process referred to as "indirect bonding."

In general, indirect bonding techniques involved the use of a transfer tray having a shape that matches the configuration of at least part of a patient's dental arch. A set of orthodontic appliances such as brackets or attachments are releasably connected to the tray at certain, predetermined locations. Adhesive is applied to the base of each appliance, and the tray is then placed over the patient's teeth until the adhesive hardens. Next, the tray is detached from the teeth as well as from the appliances, with the result that all the appliances previously connected to the tray are now bonded to the respective teeth at their intended, predetermined locations. One example of a method of making an indirect bonding transfer tray for orthodontic appliances is disclosed in published European Patent No. 2931166B1 Application No. 1 2196 586, "Method of Making a Mockup Including Analogs Approximating Orthodontic Brackets." Another example of a method of making a transfer tray for orthodontic appliances is disclosed in U.S. Pat. No. 9,763,750 "Rapid Prototyped Transfer Tray for Orthodontic Appliances." Others example of use of indirect bonding trays are disclosed in published U.S. Patent Application Publication No. 2010/0092904 A1, "Device for Positioning at Least One Orthodontic Element," U.S. Patent No. 5,971,1754A "Indirect Bonding Method and Adhesive for Orthodontic Treatment," and U.S. Patent Application Publication No. 2008/0233528, "Indirect Bonding Trays for Orthodontic Treatment and Methods for Making the Same." One example of a dental template for direct bonding of orthodontic appliances is disclosed in Provisional U.S. Patent Application Filing No. 62/940,290, "Dental Template for Direct Bonding Orthodontic Appliances"

Although certain advances have been made in methods of predetermining locations of orthodontic appliances on a patient's teeth and tools for placement thereof, additional advancements are desired by orthodontists and their patients.

SUMMARY

This disclosure relates to an indirect bonding tray. In one example, the disclosure is directed to a bonding tray comprising: a mold body for a patient-specific, customized fit with a plurality of teeth in the patient's dental arch, the mold body having an exterior surface and an interior surface opposite the exterior surface; one or more guide aperture configured to permit the placement of an orthodontic appliance on a surface of a tooth at a predetermined location aligned with the guide aperture, when the mold body is registered on the dental arch; and one or more guides extending from the exterior surface, wherein each guide is aligned with one of the guide aperture; one or more appliance holders, wherein each appliance holder is in slidable engagement with one of the guides.

In one aspect of this embodiment, the mold body includes a patient-specific, customized fit with both the labial and lingual surfaces of a plurality of teeth. In another aspect of this embodiment, the guide is configured to permit the placement of a base of the orthodontic appliance in a direction perpendicular to the labial surface of the tooth aligned with the guide aperture. In another aspect of this embodiment, the apertures include a substantially enclosed perimeter. In yet another aspect of this embodiment, the tray further includes an orthodontic appliance positioned within each appliance holder. In an aspect of this aspect, the holder and orthodontic appliance together are in a slidable engagement with the guide between a first position and a second position, wherein in the first position, the holder and orthodontic appliance are positioned away from the tooth, and in the second position, the base of the orthodontic appliance is in contact with the surface of the tooth. And, in a further aspect, the orthodontic appliance includes a layer of adhesive on its base.

In another aspect of this embodiment, the indirect bonding tray comprises a custom-engineered compliant mechanism where a portion of the mold body is pivotable relative to a portion of the mold body. In an aspect of this aspect, the custom-engineered compliant mechanism is a hinge, a pivot, a score line, a weakened portion, an engineered line of weakness, a line of concentrated stress, a frangible portion, a perforation, a bendable element, a thinner portion, a portion with lower modulus of strength, or a predetermined slot, void or gap, wherein the compliant mechanism is located at a predefined location or locations on the patient-specific, customized bonding tray. In another aspect of this aspect, the custom-engineered complaint mechanism is breakable at a predefined location to aid in separating portions of the facial mold body from the dental arch after one or more orthodontic appliances are bonded to the labial surface of the teeth.

In another aspect of this embodiment, the mold body comprises an elastomeric material. In another aspect of this embodiment, the mold body comprises a flexible silicone rubber. In yet another aspect of this embodiment, the mold body comprises a frangible material.

In another aspect of this embodiment, the interior surface of the mold body is configured to engage all teeth of the dental arch, and wherein the inner surface includes a plurality of contour portions, each portion matching the contour of a corresponding labial tooth surface. In another aspect of this embodiment the guide further comprises breakable positioning portions, and wherein the appliance holders are in slidable engagement with one of the guides between a first position and a second position, wherein in the first position the appliance holder is in contact with the breakable positioning portions. In another aspect of this embodiment, the mold body is manufactured by three-dimensional printing. In yet another aspect of this embodiment, the mold body comprises at least partially translucent materials.

In yet another aspect of this embodiment, each guide further comprises breakable positioning portions and each appliance holder includes slots for engaging with the breakable positioning portions. In another aspect of this embodiment, each appliance holder further comprises breakable positioning portions and each guide includes slots for engaging with the breakable positioning portions. In another aspect of this embodiment, the appliance holder and guide have a first friction fit, wherein in the first friction fit the appliance holder is located away from the intended tooth. In another aspect of this aspect, each appliance holder and guide have a second fit, wherein in the second fit the appliance contacts the intended tooth.

In another aspect of this embodiment, each guide further includes at least two surfaces configured to angle the appliance holder at a predetermined angle relative to the surface of the intended tooth. In one aspect of this aspect, each appliance holder includes at least two more surfaces configured to angle the appliance holder at a predetermined angle relative to the surface of the intended tooth. In another aspect of this embodiment, the indirect bonding tray further comprises a pressure plate to push all the appliance holders down their corresponding guides substantially simultaneously. In another aspect of this aspect, the pressure plate holds the orthodontic appliances in place next to the corresponding tooth surface until such orthodontic appliances are bonding to the teeth. In another aspect of this embodiment, the indirect bonding tray further includes an appliance holder tab.

In another aspect, the disclosure is directed to methods of using an indirect bonding tray. In one embodiment the method comprises: providing a mold body for a patient-specific, customized fit with a plurality of teeth in the patient's dental arch, the mold body having an exterior surface and an interior surface opposite the exterior surface and the mold body comprising one or more guides extending from the exterior surface, each guide including a guide aperture configured to permit the placement of an orthodontic appliance at a predetermined location on a surface of a tooth aligned with the guide aperture, when the mold body is registered on the dental arch; providing a plurality of appliance holders; providing a plurality of orthodontic appliances; placing one of the orthodontic appliances into each appliance holder; and slidably engaging each appliance holder with one of the guides. In another aspect of this embodiment, the method further comprises registering the mold on the patient's teeth. In another aspect of this aspect, the method further comprises bonding the orthodontic appliances to the teeth. In another aspect of this embodiment, the type of orthodontic appliance is preselected for each tooth and such appliance is placed in the orthodontic appliance holder for that tooth.

In another aspect, the disclosure is directed to a method of designing an indirect bonding tray. In one embodiment, the method comprises: receiving, by one or more processors, three-dimensional scan data of a tooth structure of a patient; designing, by the one or more processors, a custom indirect bonding tray for indirect bonding orthodontic appliances based on the three-dimensional scan data of the tooth structure of the patient, and the desired tooth structure of a plurality of teeth to receive an orthodontic appliance bonded to the patient, wherein the indirect bonding tray comprises: a mold body for a patient-specific, customized fit with a plurality of teeth in the patient's dental arch, the mold body having an exterior surface and an interior surface opposite the exterior surface; one or more guides extending from the exterior surface, the guide including a guide aperture configured to permit the placement of an orthodontic appliance on a surface of a tooth at a predetermined location aligned with the guide aperture, when the mold body is registered on the dental arch; and a plurality of appliance holders, wherein each appliance holder is in slidable engagement with one of the guides. In another aspect of this embodiment, the mold body is manufactured by three-dimensional printing.

In another aspect, the disclosure is directed to a method of bonding appliances to teeth. In one aspect of this embodiment, the method comprises: providing indirect bonding tray comprising: a mold body for a patient-specific, customized fit with a plurality of teeth in the patient's dental arch, the mold body having an exterior surface and an interior surface opposite the exterior surface; one or more guides extending from the exterior surface, the guide including a guide aperture configured to permit the placement of an orthodontic appliance on a surface of a tooth at a predetermined location aligned with the guide aperture, when the mold body is registered on the dental arch; and a plurality of appliance holders, wherein each appliance holder is in slidable engagement with one of the guides; positioning an orthodontic appliance within each appliance holder, wherein the orthodontic appliance includes a layer of adhesive on its base; placing the indirect bonding tray on the patient's dental arch; moving a plurality of the appliance holders to contact the layer of adhesive on the orthodontic appliances to the respective plurality of teeth through the guide apertures; bonding the orthodontic appliance to the teeth; and removing the indirect bonding tray from the patient's teeth.

In another aspect of this embodiment, the method further comprises: sliding each appliance holder from a first position to a second position, wherein in the first position the orthodontic appliance is away from the tooth and in the second position the orthodontic appliance is adjacent the tooth surface. In another aspect of this embodiment, the orthodontic appliance includes a layer of adhesive on its base. In another aspect of this aspect, the adhesive is applied to the base before the appliance is positioned within the holder. In another aspect of this embodiment, each guide further comprises breakable positioning portions and each appliance holder includes slots for engaging with the breakable positioning portions, wherein in the first position, the slots are engaged with the positioning portions, and further comprising breaking the breakable positioning portions when sliding the guides to the second position. In yet another aspect of this embodiment, the appliance holder and guide have a first friction fit, wherein in the first friction fit the appliance holder is located away from the intended tooth, and further comprising sliding the guides to a second fit, wherein in the second fit the appliance contacts the intended tooth. In another aspect of this embodiment, the method further comprises bonding the orthodontic appliances to the teeth. In another aspect of this embodiment, the type of orthodontic appliance is preselected for each tooth and such appliance is placed in the orthodontic appliance holder for that tooth.

In another aspect of this embodiment, the mold body further comprises a custom-engineered compliant mechanism where a portion of the mold body is pivotable relative to a portion of the mold body. In another aspect of this aspect, the custom-engineered compliant mechanism is a hinge, a pivot, a score line, a weakened portion, an engineered line of weakness, a line of concentrated stress, a frangible portion, a perforation, a bendable element, a thinner portion, a portion with lower modulus of strength, or a predetermined slot, void or gap, wherein the compliant mechanism is located at a predefined location or locations on the patient-specific, customized bonding tray. In another aspect of this aspect, the custom-engineered complaint mechanism is breakable at a predefined location to aid in separating portions of the facial mold body from the dental arch after one or more orthodontic appliances are bonded to the labial surface of the teeth.

In another aspect of this embodiment, the mold body comprises an elastomeric material. In another aspect of this embodiment, the mold body comprises a flexible silicone rubber. In yet another aspect of this embodiment, the mold body comprises a frangible material.

In another aspect, the disclosure is directed to a kit. In one embodiment of this kit, the kit comprises: an indirect bonding tray, the bonding tray comprising: a mold body for a patient-specific, customized fit with a plurality of teeth in the patient's dental arch, the mold body having an exterior surface and an interior surface opposite the exterior surface; one or more guides extending from the exterior surface, the guide including a guide aperture configured to permit the placement of an orthodontic appliance on a surface of a tooth at a predetermined location aligned with the guide aperture, when the mold body is registered on the dental arch; one or more orthodontic appliance holders, wherein each appliance holder is in slidable engagement with one of the guides. In another aspect of this embodiment, the kit further comprises a plurality of orthodontic appliances, wherein each appliance holder holds one orthodontic appliance. In another aspect of this aspect, the kit further comprises packaging for containing the tray and orthodontic appliances, wherein the packaging protects from light, curative loss, and contamination. In another aspect of this aspect, the plurality of orthodontic appliances each include a layer of adhesive and the packaging protects the adhesive from light.

DETAILED DESCRIPTION

Figure 1:
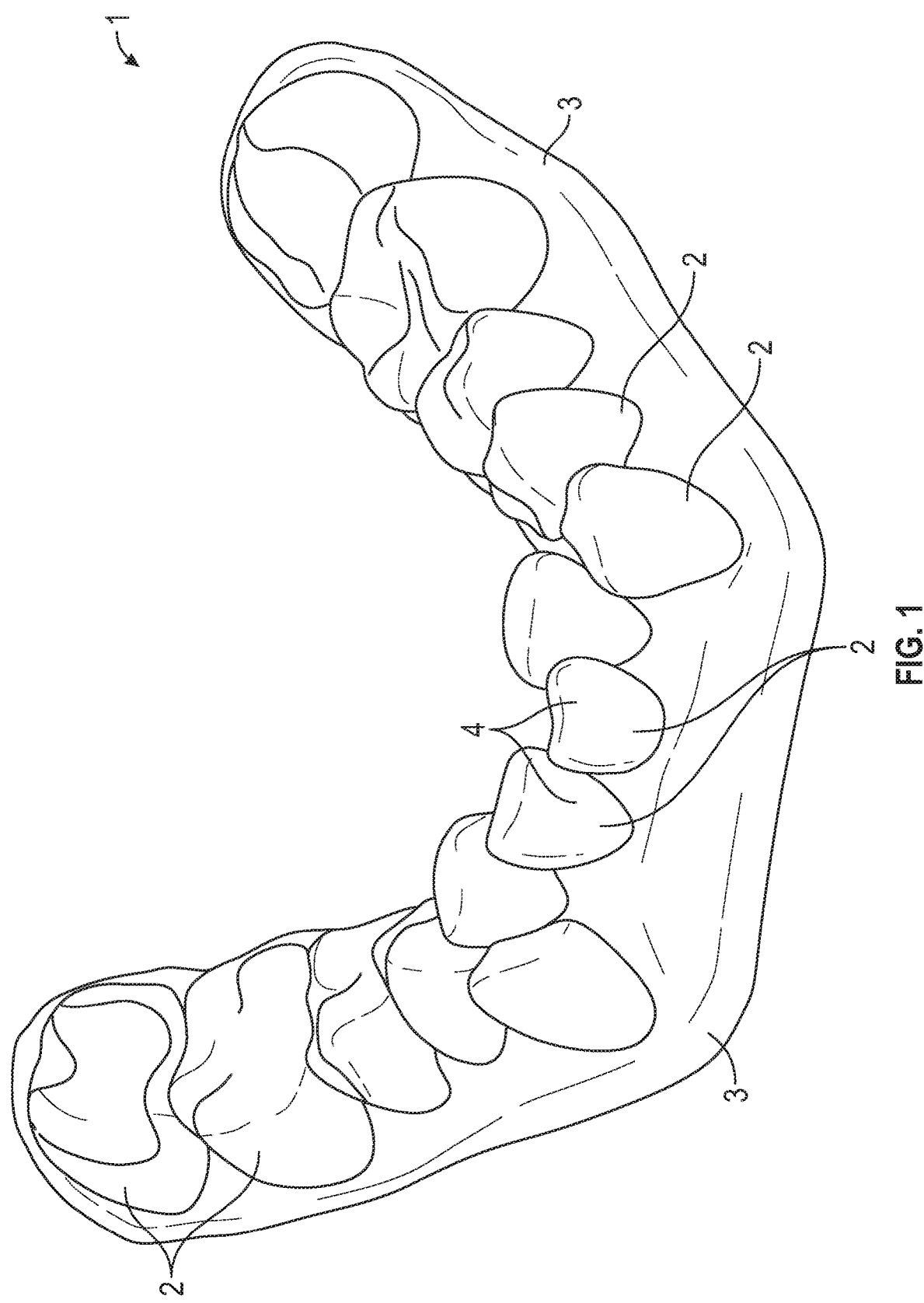
FIG. 1 is a perspective view of an exemplary dental arch of a patient for use with an indirect bonding tray of the present invention for bonding orthodontic appliances to the teeth of the patient.

The primary objective of orthodontics is to move a patient's teeth to a position where the teeth are esthetically pleasing. Orthodontic treatment may include standardized brackets and wires, such as those components in a "straight-wire" appliance system. Conventional orthodontic appliances such as brackets are positioned by hand by an orthodontist in defined positions and orientations according to standardized placement rules. The orthodontist may also visually gauge proper bracket positions and imagining treatment outcomes. After placement is determined, the brackets are then bonded by a small quantity of adhesive placed on the base of each bracket. The bracket may be bonded to the tooth using either a two-part chemical cure adhesive or a one-part light-cure adhesive. The uncured adhesive is sufficiently viscous and tacky to allow temporary adhesion and visual adjustment prior to final bonding. This method of bracket placement is known as "direct bonding." To save time and ease of handling, some brackets are offered as precoated with adhesive or an adhesive system, such as for example APC™ Flash-Free Adhesive Coated Appliance System, commercially available from 3M Company, St. Paul, Minnesota, which include an adhesive system of uncured adhesive integrated into a web of micron-sized polypropylene fibers arrayed in a nonwoven material format on the bracket bases when they come from the factory. Once the orthodontic appliances are bonded on the teeth, the combination of the arch wire and appliances adjusted over time move the teeth towards their intended final position.

A skilled orthodontist may become very good at visually gauging proper bracket positions and imagining treatment outcomes for patients. However, it can take many years to acquire this skill, and even then, manual wire bends and bracket repositioning may be needed later in treatment to correct minor placement errors and achieve better results.

The present invention provides indirect bonding trays for indirectly bonding orthodontic appliances to a patient's moth. These dental templates are formed using virtual treatment planning software often used in the indirect bonding process to provide accurate bracket placement, but include the advantage of indirect bonding the appliances normally (orthogonally) to the teeth surface, which provides good bond reliability. One possible disadvantage of prior indirect bonding methods is that the orthodontic appliance slides over the facial or lingual surface of the tooth in an occluso-gingival direction during installation, thus smearing or wiping adhesive off the bracket base before coming to rest in its target position on the tooth. This may result in a poor bond between the orthodontic appliance and the tooth, requiring rebonding or replacements, ineffective treatment, or unintentionally consumed appliances. Another disadvantage of indirect bonding is that it requires the delicate additional step of preloading the orthodontic appliances into the transfer tray in such a way that they are releasably connected to the tray at certain, predetermined locations.

The indirect bonding tray of the present invention does not have the disadvantages of the prior indirect bonding tray and placement procedure. The indirect bonding trays of the present invention provide more accurate placement of the orthodontic appliances, including more accurate measurement and analysis in comparison to direct bonding by hand. In addition, the indirect bonding trays and use thereof provides reduced doctor/patient time in the chair and better treatment outcomes. In fact, the orthodontist may be able to delegate the procedure for bonding the orthodontic appliances to another sufficiently qualified staff member because the planning of the position of each appliance is removed from the chairside procedure. Also, the indirect bonding trays may be shipped preloaded with the orthodontic appliances or brackets already mounted therein, which is an additional time saver. The orthodontic appliances may include a layer of adhesive, which cuts down on chair time for the patient and orthodontist.

The indirect bonding trays of the present invention allow for placement and bonding of the orthodontic appliances individually, allowing for greater control over adhesive delivery because the orthodontic appliances are bonded one at a time, instead of all at once. For example, the indirect bonding trays provide greater control over the finer aspects of orthodontic placement, such as controlling of the potential excess of filled adhesive (i.e., flash) from around the base's perimeter and forming a smooth film of adhesive between the base and the tooth. The specially designed guides in the trays are designed to deliver the orthodontic appliance at precisely the correct location and at the correct angle relative to the patient's tooth.

Other embodiments of the indirect bonding trays of the present invention allow for placement and bonding of a plurality of orthodontic appliances at the same time, which saves time for the patient to be in the chair.

With the indirect bonding trays of the present invention if a bracket is lost or damaged by the patient, it can be easily re-bonded using the original dental tray with a new bracket. Also, the tray, guides, and orthodontic brackets may all be shipped assembled in one package directly to the dentist, or the tray maybe shipped in one package and the guides with the orthodontic brackets placed in them maybe shipped in another package. The indirect bonding tray 10 could be included in a kit for the orthodontist for a specific patient. The kit would include the guides all preloaded with orthodontic appliances 60 each having an adhesive already applied to its base. The packaging could protect its components, such as the adhesive, from light, curative loss, or contamination.

In addition, the indirect bonding trays of the present invention may be digitally designed and printed using additive manufacturing to provide a patient specific customized dental template.

FIG. 1 illustrates an exemplary physical or virtual model of a dental arch 1 of a patient, which is useful for illustrating for use with a dental template of the present invention for indirect bonding orthodontic appliances to the teeth of the patient. The dental arch 1 includes teeth 2, including facial surfaces 4 of the teeth, and gums 3, including gingival tissue.

Figure 2A:
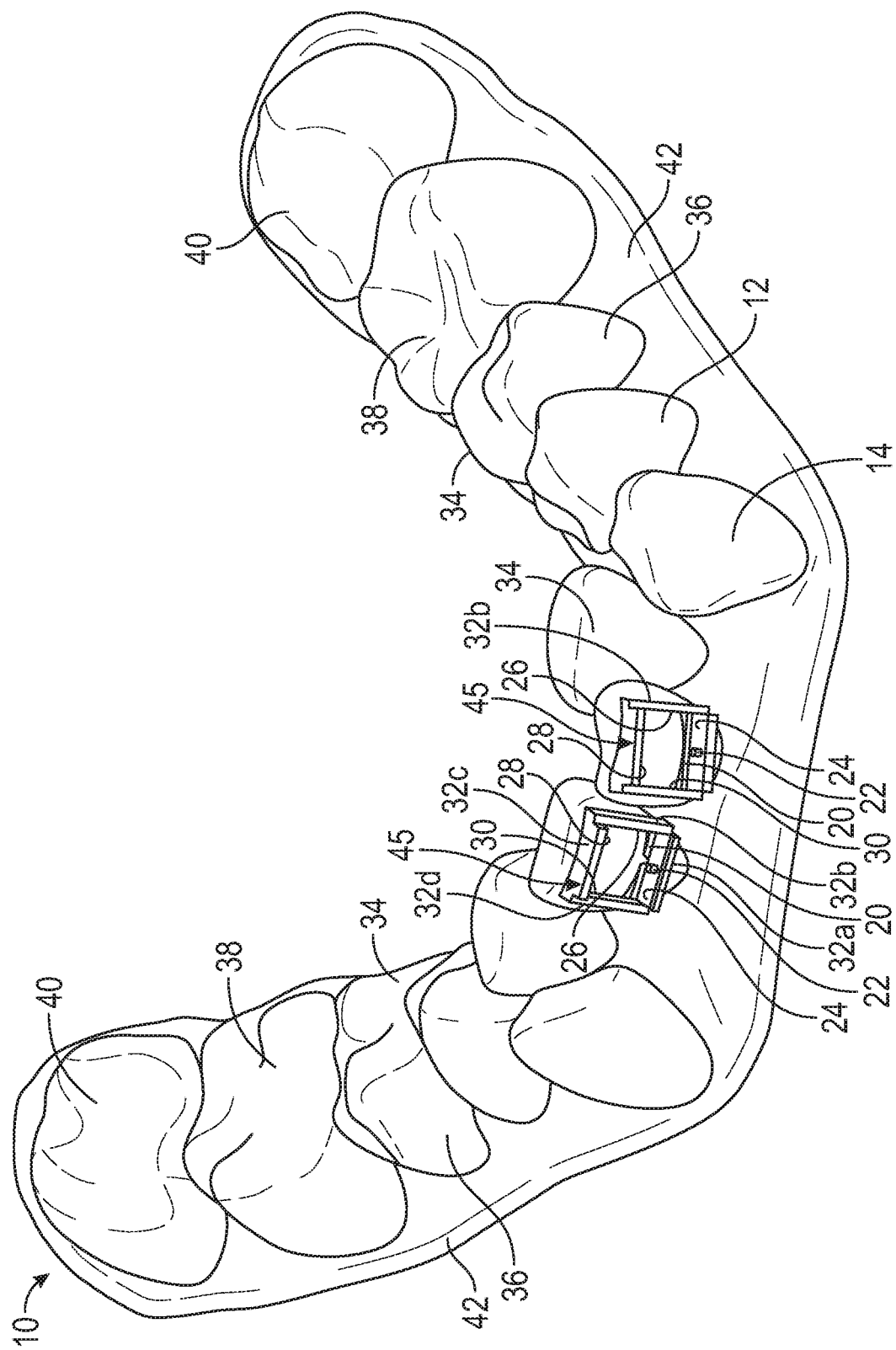
FIG. 2A is a front perspective view of an exemplary embodiment of indirect bonding tray of the present invention.
Figure 2B:
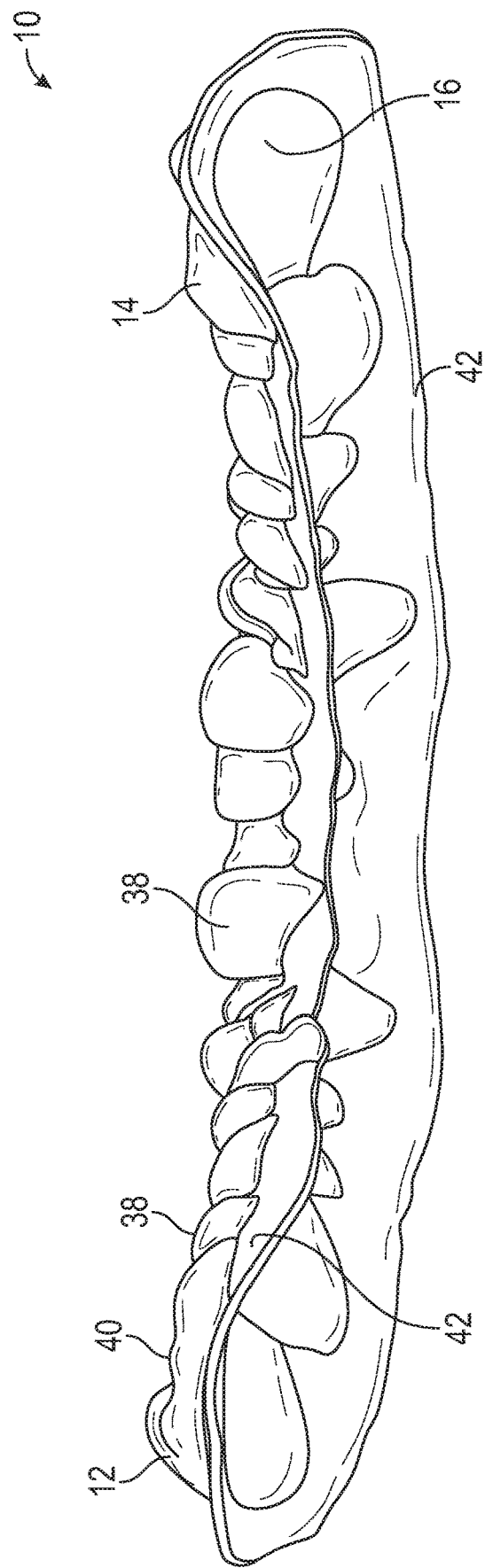
FIG. 2B is a rear perspective view of the indirect bonding tray of FIG. 2A.

FIGS. 2A and 2B illustrate an exemplary indirect bonding tray 10 of the present invention, which is used for indirect bonding orthodontic appliances to a patient's teeth. The indirect bonding tray 10 is specially designed to register and fit onto a specific patient's dental arch. As such, each tray 10 is made to have a patient-specific, customized fit with one particular patient. The indirect bonding tray 10 includes a mold body 12 having an exterior surface 14 and an interior surface 16 opposite the exterior surface 14. The mold body 12 is designed to register or engage with at least a portion of the labial and lingual surfaces the individual patient's teeth, respectively. The mold body 12 may include labial, lingual, gingival and occlusal regions. The labial region 34 and lingual regions 36 are designed to register or engage with at least a portion of the gingival and occlusal surfaces the individual patient's teeth, respectively. Likewise, the gingival region 42 and occlusal regions 38 are designed to register or engage with at least a portion of the gingival and occlusal surfaces the individual patient's teeth, respectively. The indirect bonding tray 10 is designed to include these regions, depending on the final desired orthodontic appliance placement on the individual patient's teeth.

Each tray 10 is custom designed to fit a certain patient ("patient specific"), and thus has a customized fit with a plurality of teeth 2 in the patient's dental arch. For example, for embodiments of mold body 12 that contact the facial surfaces 4 and/or lingual surfaces of the teeth 2, the inner surfaces 16 are contoured to match the corresponding facial tooth surfaces 4 and/or lingual surfaces of the individual patient. For embodiments that include mold body 12 that contact the gingiva of the patient, the gingiva region 42 include interior or inner surfaces 16 contoured to match a portion of the corresponding gingiva of that individual patient.

For mold body 12 embodiments that contact the molars of the teeth 2, the interior surface or inner surfaces 16 are contoured to match the corresponding molar surfaces of the individual patient. For instance, the molars might fit into certain molar regions 40, as illustrated. For one full dental arch, the mold body 12 may include a first molar portion 40 and a second molar portion opposite the first molar portion, such that the tray 10 engages all of the teeth in the patient's dental arch. Alternatively, the mold body 12 could include only one molar portion 40 or no molar portions 40. That being said, the molar portions 40, may serve as anchors for the indirect bonding tray 10 on the patient's teeth. In another embodiment, the mold body 12 could include a molar portion on any of first, second and third molars. The molar portion may or may not include an guide aperture 20. Ideally, the indirect bonding tray 10 is designed to have a comfortable snap fit with the patient's teeth, by engaging with the naturally occurring undercuts on or between the teeth.

The dental template 10 may be designed to engage with all the teeth 2 in the patient's mouth, or only select plurality of teeth, depending on which teeth are to bear an orthodontic appliance 60. For each tooth 2 that will receive an orthodontic appliance 60, there is a corresponding guide aperture 20 shaped to guide an appliance holder 44 to a specific location on the adjacent tooth 2 to bond the appliance 60 at such position, when the mold body 12 is registered on an individual patient's dental arch. The apertures 20 have a substantially enclosed perimeter or an entirely enclosed perimeter.

FIGS. 2A and 2B illustrate an indirect bonding tray 10 having one type of exemplary guide aperture 20 extending from the exterior surface 14. However, various shapes of apertures are envisioned, so long as it helps guide the placement of where to bond the appliances 60 on the teeth 2 at a predetermined location with the use of the orthodontic appliance holder 44. In fact, a certain shape of guide aperture could be used for certain teeth, to avoid mix ups like placing a cuspid orthodontic appliance on a bicuspid, for example. Although the Figures illustrate the use of only two guide apertures 20 and orthodontic appliance holders 44, it is expected that the indirect bonding tray 10 could be designed to include any number of guide apertures and corresponding appliance holders 44, and that the majority of the teeth 2 in the patient's arch 1 would receive orthodontic appliances through use of such tray 10. Thus, the Figures should not be deemed as somehow limited.

The guide apertures 20 are designed to closely conform to the entire perimeter of the bracket base and holder 44, and may possibly include a small tolerance for variation in the dimension of the bracket 60, bracket base 62, holder 44 and/or tray 10, or to allow the formation of the adhesive fillet surrounding the base where it mates with the intended tooth. Each orthodontic appliance holder 44 is designed to slidably engage with one of the guides 18, and to deliver an orthodontic appliance or bracket 60 to the predetermined location on a particular tooth of the patient. Each guide aperture 20, guide 18, and appliance holder 44 is aligned with a predetermined location for each tooth to receive an orthodontic appliance 60 bonded thereto.

Figure 3A:
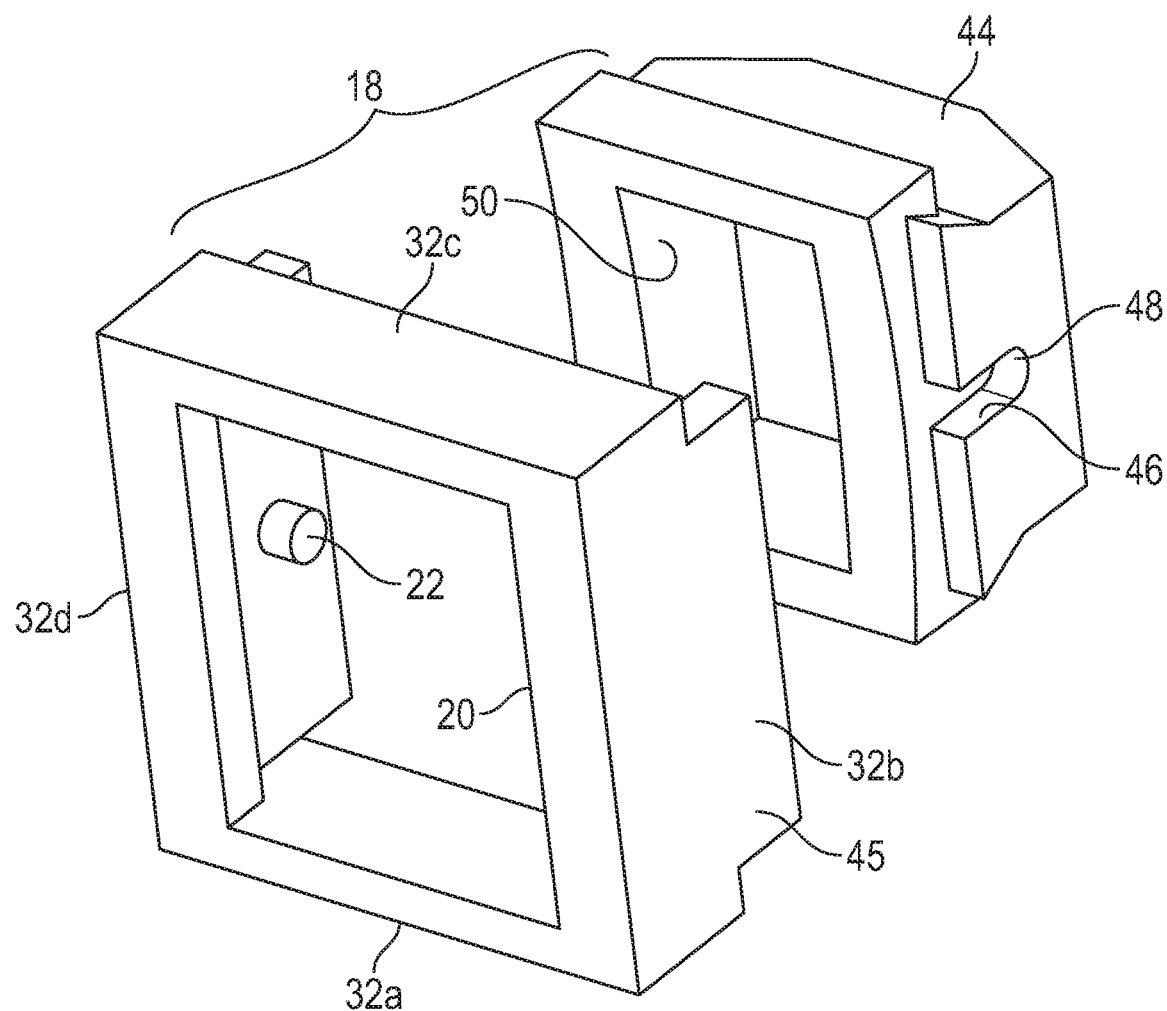
FIG. 3A is an exploded perspective view of one embodiment of an orthodontic appliance guide.

As illustrated, the guide apertures 20 include a substantially enclosed perimeter, although this is not essential. The guide 18 include at least one surface or edge configured to engage a surface or edge feature of the corresponding orthodontic appliance holder 44 (illustrated in more detail in FIGS. 3 and 4). The appliance holder 44 is designed guide the position and orientation of the bracket or orthodontic appliance 60 on the tooth surface, according to the digital treatment plan. Specifically, the appliance holder 44 is designed to place the base 62 of the orthodontic appliance 60 in a direction generally perpendicular to the labial surface of the tooth aligned with the guide aperture 20, as illustrated in FIG. 5. Although, the appliance holder 44 may also be designed to place the base at a slight tilt to the generally perpendicular position relative to the labial surface, which assists in creating some custom torques or rotations of the tooth during treatment.

Figure 3B:
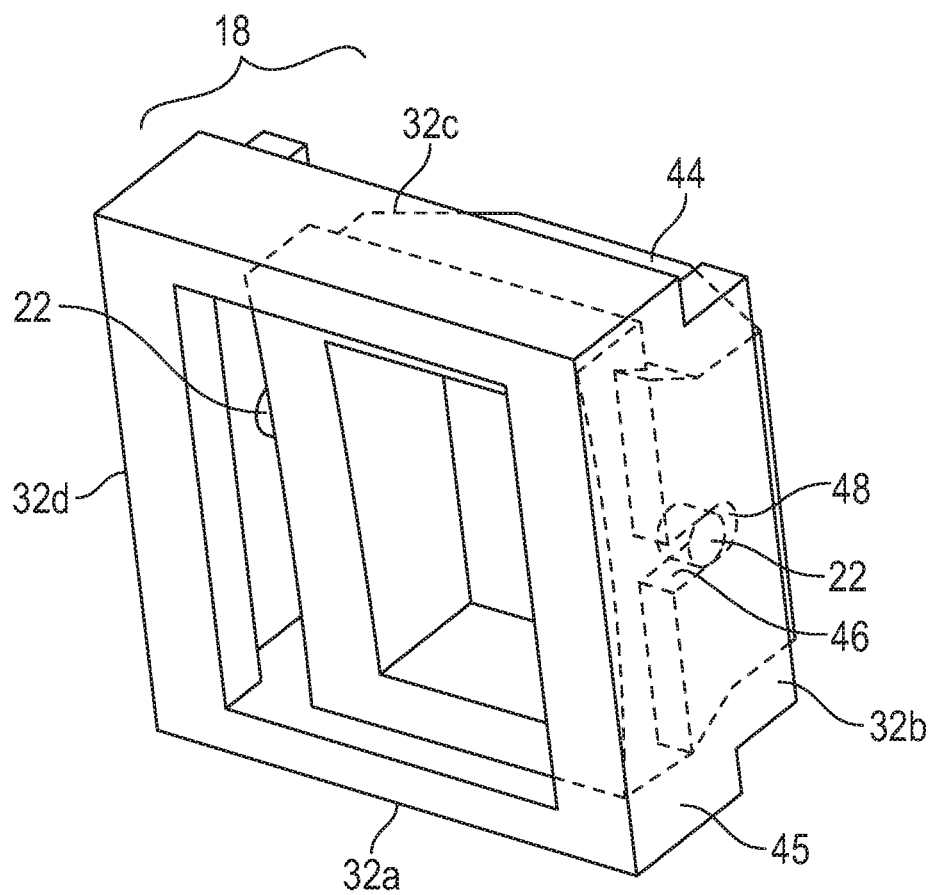
FIG. 3B is a perspective view of the orthodontic appliance guide of FIG. 3A.

One exemplary example of a suitable orthodontic guide 18 for engaging with a guide aperture 20. The appliance holder 44 and positioning portion 45 are illustrated spaced apart in FIG. 3A. FIG. 3B illustrates the orthodontic appliance holder 44 inserted into positioning portion 45 to form the orthodontic guide 18. An orthodontic appliance 60 (not illustrated) will be housed inside the holder 44.

The guide 18 is illustrated as including two portions, an orthodontic appliance holder 44 and a positioning portion 45. However, the guide may be in any configuration, so long as it connects with the guide aperture 20 and directs the orthodontic appliance 60 to the predetermined location on the patient's tooth. In the embodiment illustrated, the orthodontic appliance holder 44 includes a well 50 for receiving the orthodontic appliance 60. The orthodontic appliance holder 44 is designed for receiving an appropriate orthodontic appliance 60 intended for that particular tooth in the well 50. For example, a specific well 50 could be designed to only receive a particular sized and shaped base 62 of a particular orthodontic appliance 60 intended for that well 50. In addition, the holder 44 may be designed such that the orthodontic appliance 60 is oriented in the proper direction, so that its base 62 is facing the tooth's surface, while positioned within the holder 44. The holder 44 also has stop 48 for engaging with a breakable portion 22 in the positioning portion 45.

In the illustrated embodiment in FIGS. 2a, the positioning portion 45 of the guide 18 is designed to guide the orthodontic appliance 60 through the guide aperture 20 for bonding to the tooth. In this embodiment, the positioning portion 45 has a first wall 24, a second wall 26, a third wall 28, and a fourth wall 30. The first wall 24 is opposite the third wall 28, and the second wall 26 is opposite the fourth wall 30. The positioning portion 45 also has external walls 32. External wall 32a is opposite first wall 24. External wall 32b is opposite second wall 26. External wall 32c is opposite third wall 28. External wall 32d is opposite fourth wall 30.

From assembly, while in transit from the supplier to the orthodontist, and up to just prior to bonding the orthodontic appliance 60 the specific patient, the orthodontic appliance 60 maintains its position within the orthodontic appliance holder 44. Any configuration may be used for holding the appliance 60 within the holder 44. As illustrated, the orthodontic appliance holder 44 may include a slot 46 with a stop 48 that engages with breakable portion 22 located within the positioning portion 45. The slot 46 and breakable portion 22 are configured to fit together in slidable engagement into a position using the stop 48 such that the base of the orthodontic appliance 60 is not in contact with the bottom of the positioning portion, in other words, spaced apart from the intended tooth, when the tray 10 is on the patient's dental arch 1.

As another embodiment, the appliance holder 44 and positioning portion 45 could be designed to frictionally fit together. In this embodiment, the holder 44 and portion 45 could have a first frictional fit and a second frictional fit. In the first friction fit, the appliance holder 44 is located away from the intended tooth. In the second frictional fit, the appliance 60 contacts the intended tooth. An orthodontist could move the appliance holder 44 from the first frictional fit to the second frictional fit by depressing the holder 44 into the portion 45 of the guide 18.

The base 62 of the orthodontic appliance 60 ideally will include a layer of adhesive before the orthodontic appliance 60 is inserted into the well 50 of the holder 44, and then shipped to the orthodontist. However, if not, when the orthodontist is ready to position the tray 10 onto the patient it was specifically designed for, the orthodontist will apply adhesive to all the bases 62 of the orthodontic appliances 60. The adhesive may be applied either while the holder 44 and positioning portion 45 are engaged with each other with the appliance 60 therein. Or, the adhesive may be easily applied while the holder 44 carrying the appliance 60 is separated from the positioning portion 45, and then the holder 44 and portion 45 may be then combined. The portion 45 of the guide 18 may be integrally formed as a part of the tray 10, so that it is positioned over the intended guide aperture 20, as illustrated in FIG. 2A.

Instead of the stop 48 and slot 46 configuration, in another example, the well 50 may be sized and shaped so that the base of the orthodontic appliance 60 is pressure fitted into the base of the well 50. For example, the appliance 60 could be held in the well 50 by a friction fit between the stop 48 and the arch wire slot of the appliance 60. As another example, the well 50 could contain an elastomeric-shaped in the negative of the appliance face opposite its base 62. As yet another example, certain surface roughness within the well 50 could be used to assist holding the appliance 60, along with certain low friction surface treatments to create an easier release if the release of the appliance 60 becomes difficult from the positioning portion 45.

As another example, the base of the well 50 may include pressure sensitive adhesive or a gel adhesive that could advantageously be washed away with water after curing of the adhesive on the base of the orthodontic appliance.

As yet other examples, a soft wax could hold the appliance 60 in the appliance holder 44. A loose-knit non-woven fabric or loop structure could be used to grip the appliance 60 in position within the holder 44.

Figure 4:
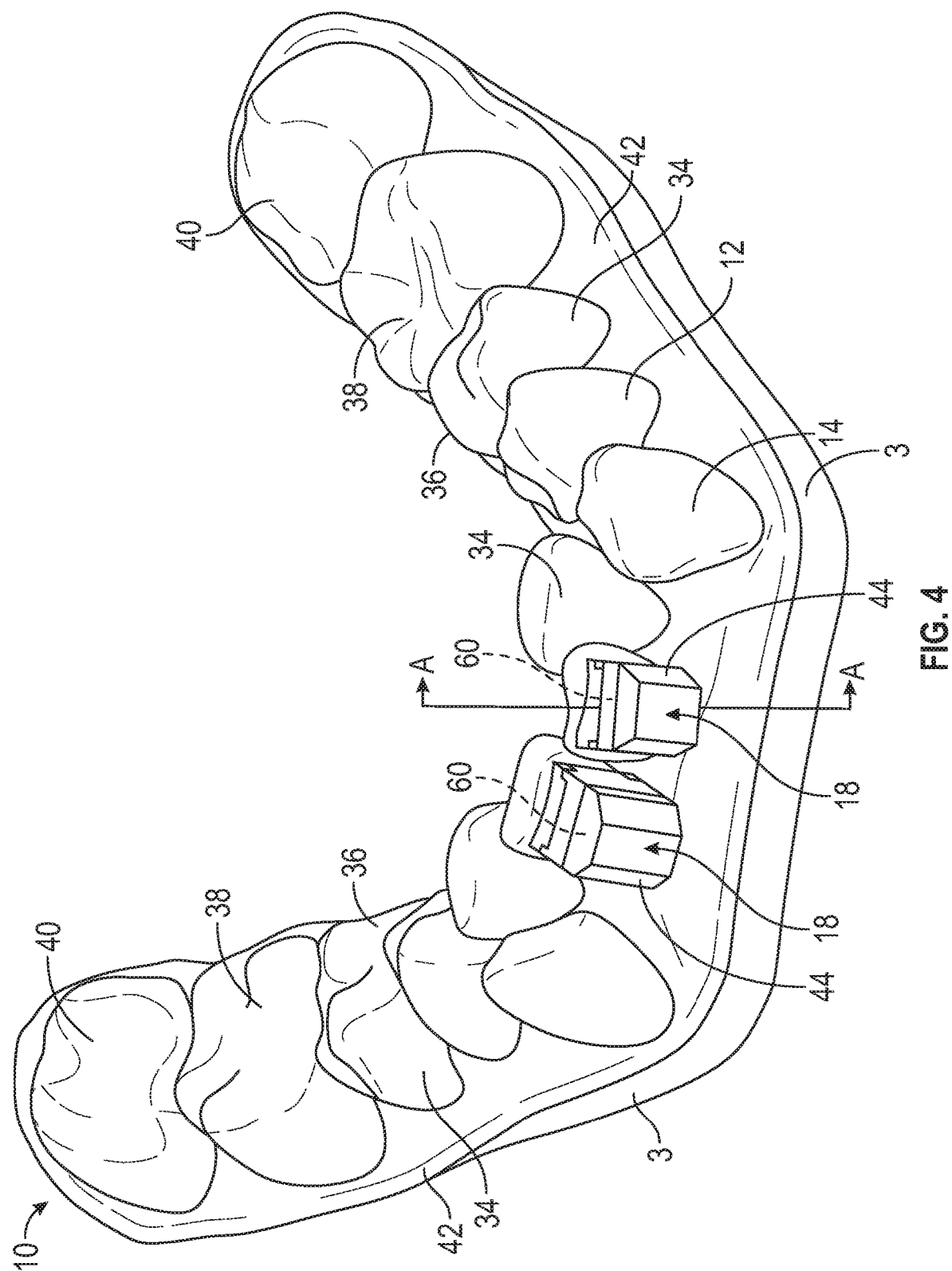
FIG. 4 is a perspective view of the indirect bonding tray of FIGS. 2A and 2B with the appliance holders of FIG. 3 on the dental arch of FIG. 1.

FIG. 4 illustrates the indirect bonding tray 10 in registration with the patient's dental arch 1. Each orthodontic appliance holder 44 is inserted into a corresponding portioning portion 45 to form guides 18, with each holder 44 an orthodontic appliance 60 therein. Although not illustrated, it is intended that the indirect bonding tray 10 would include a plurality of guides 18 and guide aperture 20, where each tooth would receive a guide 18 and corresponding orthodontic appliance 60.

All the Figures illustrate an indirect boding tray 10 having guides 18 for guiding the orthodontist in placing and bonding the appliances 60 on the labial surface of the patient's teeth aligned with each corresponding guide aperture 20. However, the indirect bonding tray 10 of the present invention may also provide a mold body 12 designed to assist in placing and bonding the appliances 60 on the lingual surface of the patient's teeth aligned with each corresponding guide aperture 20 and appliance guides 18.

Figure 6A:
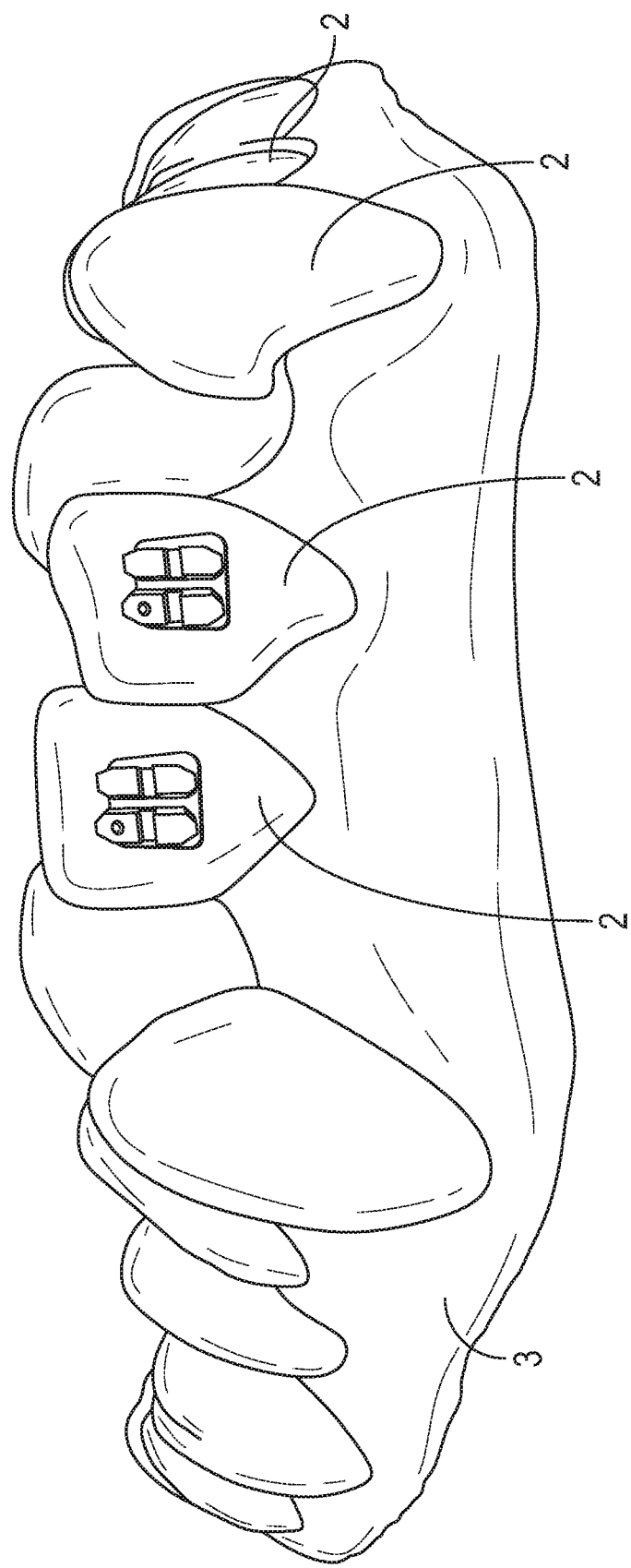
FIGS. 6A and 6B are a perspective view of the dental arch of FIG. 1 after orthodontic appliances have been bonded to the teeth.
Figure 6B:
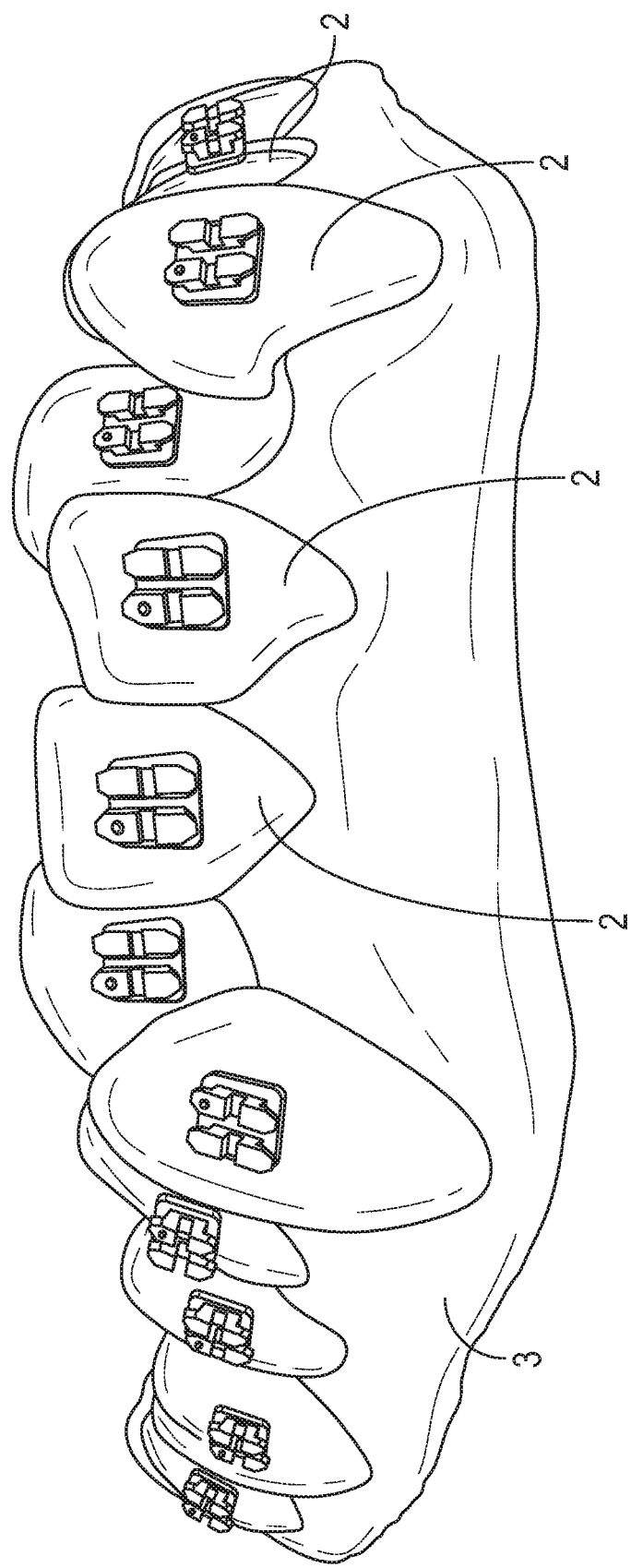

As mentioned above, although not illustrated, it is intended that the indirect bonding tray 10 would include a plurality of guides 18 and guide aperture 20, where each tooth would receive a guide 18 and corresponding orthodontic appliance 60. FIG. 6B illustrates the patient's dental arch after such a tray 10 has been used to bond a plurality of orthodontic appliances 60 to the majority of the patient's teeth.

The ideal locations for each orthodontic appliance 60 on a tooth are predetermined by the design process described in more detail below. During the use of a tray 10 for indirect bonding, an adhesive or adhesive system may be applied to the base 62 of each appliance 60 by the orthodontist or a staff member. However, the indirect bonding tray 10 is especially useful for pre-coated orthodontic appliances 60. Suitable available orthodontic appliances are commercially available from 3M Company based in St. Paul. 3M Company provides ceramic orthodontic brackets commercially as 3M™ Clarity™ brackets, metal brackets commercially as Victory Series™ brackets, Unitek™ brackets, and SmartClip™ self-ligating brackets. In addition, suitable commercially available pre-coated orthodontic appliances or brackets are available from 3M Company based in St. Paul, Minnesota as APC™ brackets, APC™ PLUS brackets, and APC™ Flash-Free brackets.

Figure 5A:
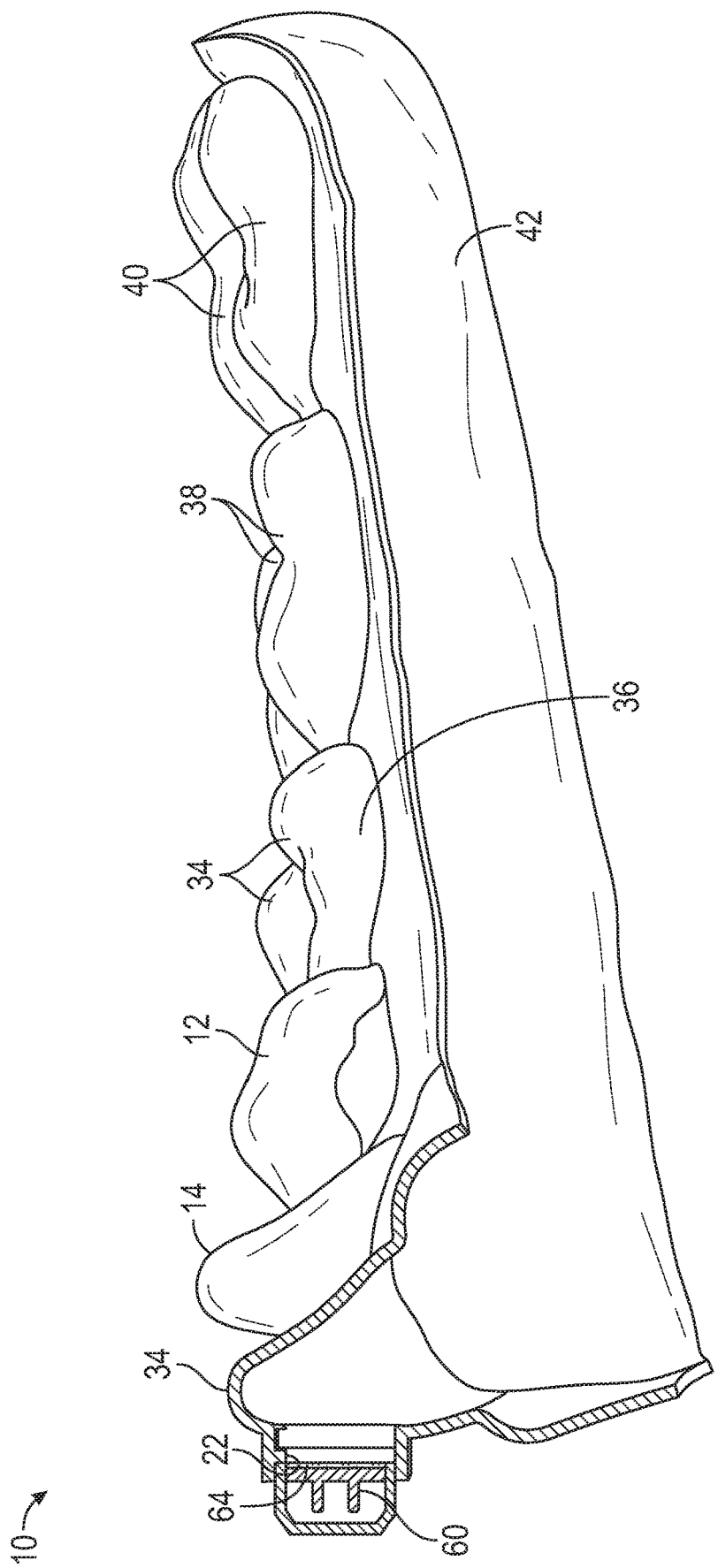
FIGS. 5A and 5B are a cross sectional view of the indirect bonding tray of FIG. 3 taking along lines A-A of FIG. 4.
Figure 5B:
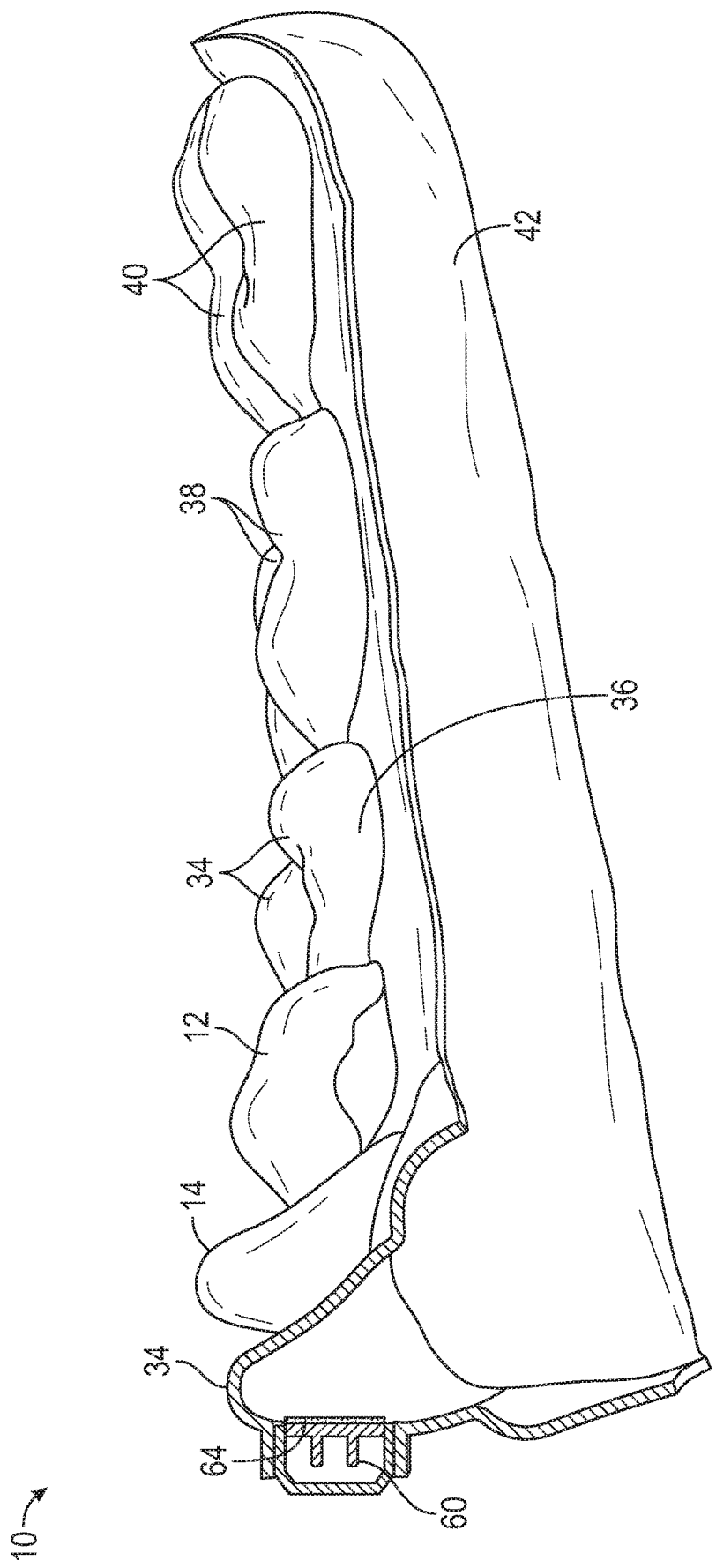

Regardless if a coat of adhesive is applied to the bracket base or if pre-coated appliances are used, each orthodontic appliance 60 is then placed through the guide aperture by pressing down on holder 44, which in turns causes the stop 48 to break the positioning portions 22, and thus to move the appliance 60 to then contact the adhesive layer on the base of the appliance 60 onto the patient's tooth. The appliance 60 will remain in place until the adhesive hardens. These steps are illustrated in FIGS. 5A and 5B. The orthodontist controls and selects the movement of each holder 44 within the portion 45 of the guide 18.

Although not illustrated, an orthodontist may use a single plunger to push each holder 44 into its accompanying positioning portion 45, or a pressure plate which is designed to push multiple holders 44 within their portions 45. The plunger or plate may frictionally fit or mate with the holder 44 so it locks with acceptable pressure on the appliance holder 44 to firmly push the appliance holder within the positioning portion to correctly position each orthodontic appliance 60 on its intended tooth.

The indirect bonding tray 10 allows the orthodontic appliance 60 to be applied at a direction generally perpendicular to the surface of the tooth 2, and in turn, helps minimize the potential to smear, or otherwise interference with, adhesives applied to the teeth during bonding. In a particular embodiment, the guide 18 is configured to permit the placement of the base 62 of the orthodontic appliance 60 in a direction perpendicular to the labial surface of the tooth aligned with the guide aperture 20. Specifically, the orthodontic appliance holder 44 of the guide 18 may include at least two surfaces configured to angle the appliance holder 44 at a predetermined angle relative to the surface of the intended tooth. Thus, such surfaces of the holder 44 would engage with the surfaces of the orthodontic appliance 60 to deliver the appliance 60 at the predetermined angle.

Smearing of adhesive may be encountered in prior art orthodontic appliance bonding, for example, when using a two-component (or A/B type) chemical cure adhesive where one adhesive component is applied to the appliance and the other component is applied to the tooth. Additionally, with prior indirect bonding trays more adhesive smearing can potentially occur on the tooth side when the resultant physical transfer tray slides onto the patient's teeth from the occlusal direction towards the gingival direction. It is generally desirable to reduce the degree of adhesive smearing, since smearing can deplete the amount of adhesive at the bonding site and thereby decrease bond reliability. Smearing can also leave an unwanted film of adhesive on portions of the teeth that are not being bonded. After removal of the indirect bonding tray 10, the adhesive used to bond each appliance 60 to the tooth is typically retained on the base of each appliance 60, and each appliance 60 is firmly bonded in its intended location.

After the orthodontic appliances 60 have been firmly bonded to their intended locations on the teeth 2, the indirect bonding tray 10 may be removed from the patient's dental arch. FIG. 6A illustrates the patient's teeth with the exemplary orthodontic appliances 60 bonded to two teeth. FIG. 6B illustrates the patient's teeth after use of an indirect bonding tray 10 having a plurality of guides 18 and guide aperture 20, where each tooth would receive a guide 18 and corresponding orthodontic appliance 60. The patient's dental arch in FIG. 6B shows a plurality of orthodontic appliances 60 bonded to the majority of the patient's teeth.

One way to remove the indirect bonding tray 10 after the orthodontic appliances 60 are bonded is if the tray is made of thin silicone, the trays may be flexible enough to stretch and be removed easily from the patient's teeth. Another way is to include a "rip cord" along the silicone trays, similar to those ripcords on a pack of gum, which allows a tear in the tray along the occlusal-incisal surfaces.

Another way to remove the indirect bonding tray 10 after the orthodontic appliances 60 are bonded, is to first remove each appliance holder 44 from their individual positioning portions 45. Such removal could be facilitated by use of holder tab on the end of the appliance holder (not illustrated). Next, all the positioning portions 45 could be removed from the tray 10. This allows for the apertures 20 to be visible to the user, and such apertures 20 could be sized large enough around the bonded appliances 60 to allow the tray (or portions of the tray discussed below) to be removed from the patient's teeth.

Figure 7:
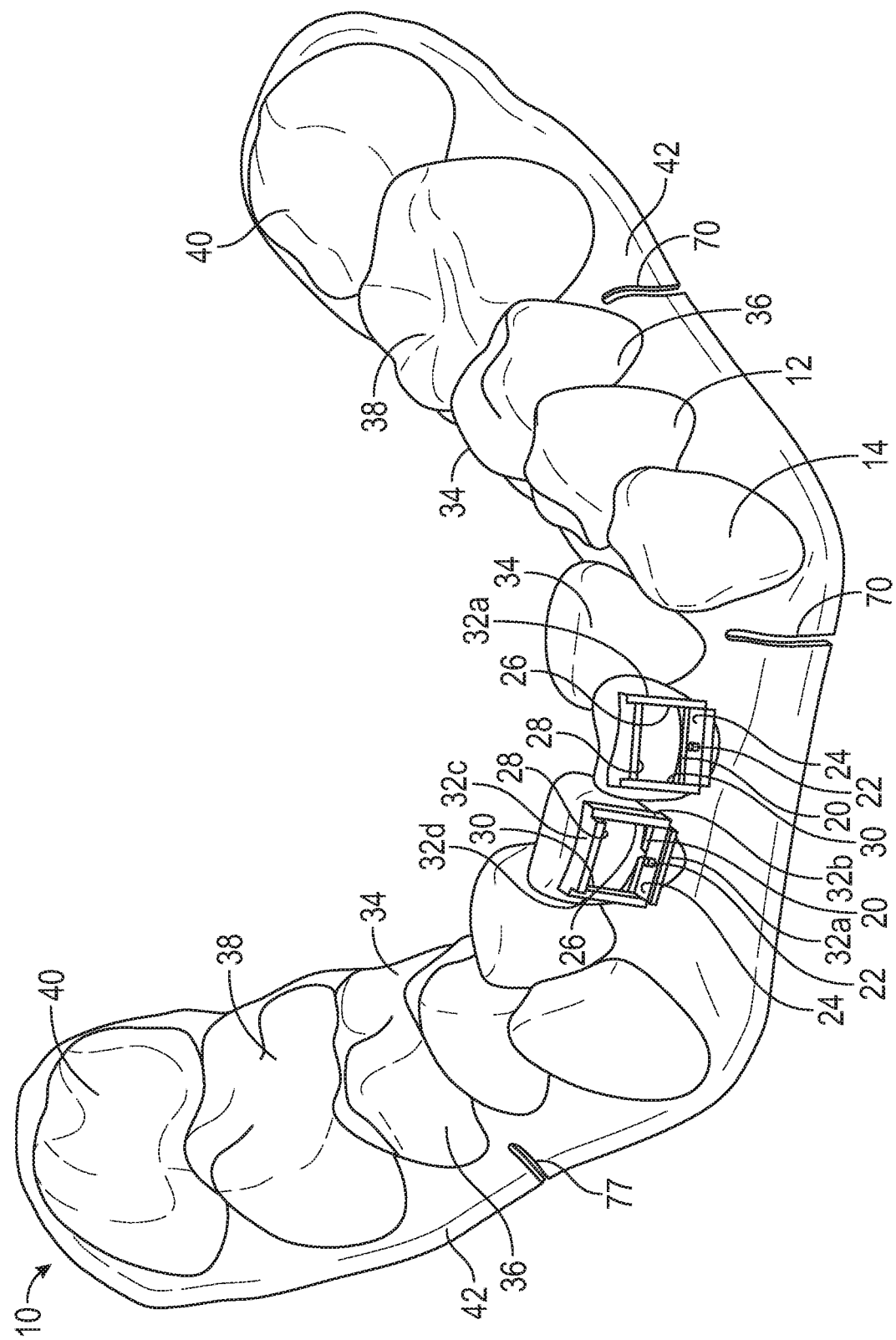
FIG. 7 is a perspective view of another exemplary embodiment of the indirect bonding tray.
Figure 8:
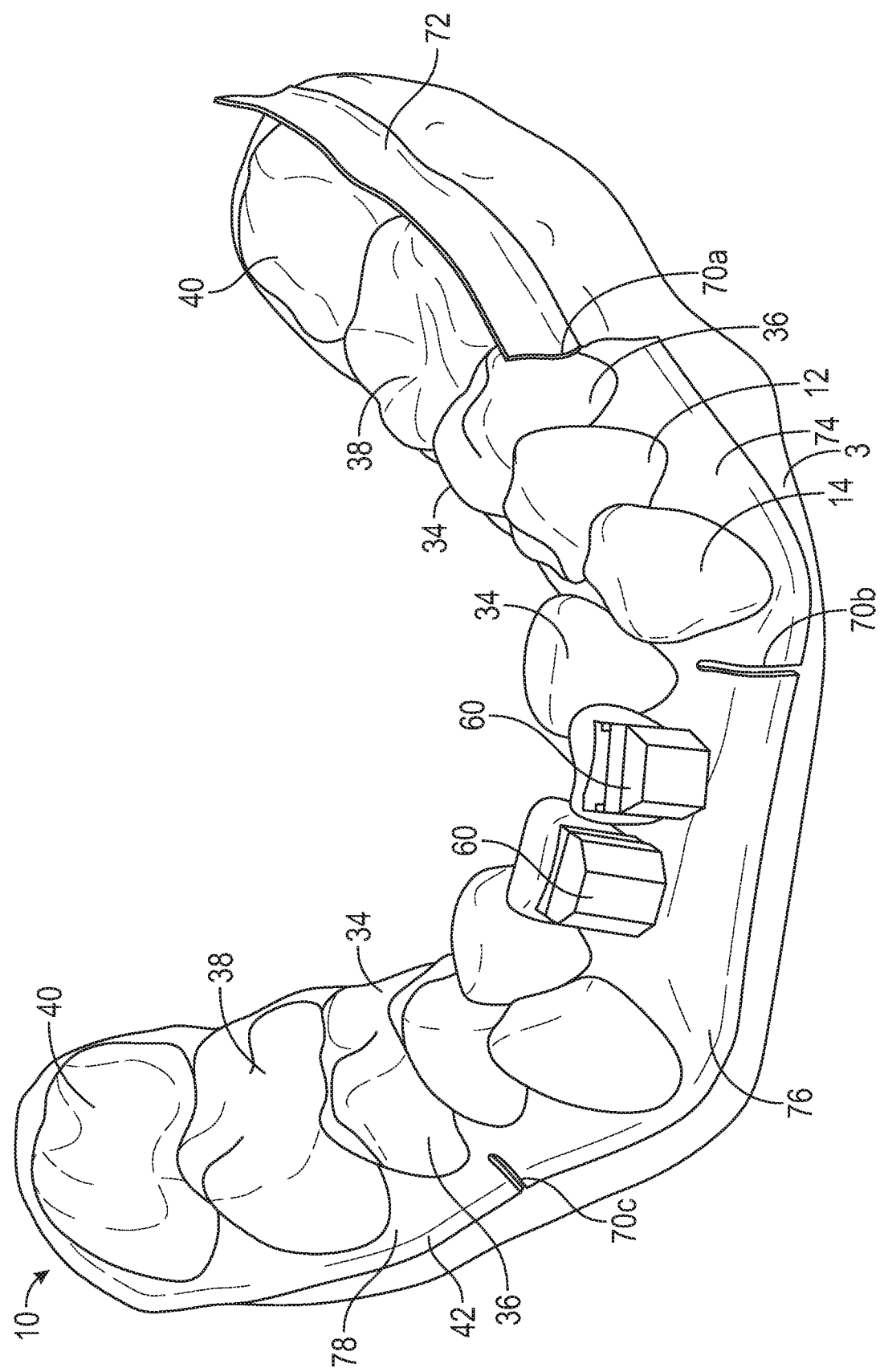
FIG. 8 is a perspective view of the tray of FIG. 7, where a portion of the tray is being removed from the patient's mouth.
Figure 9:
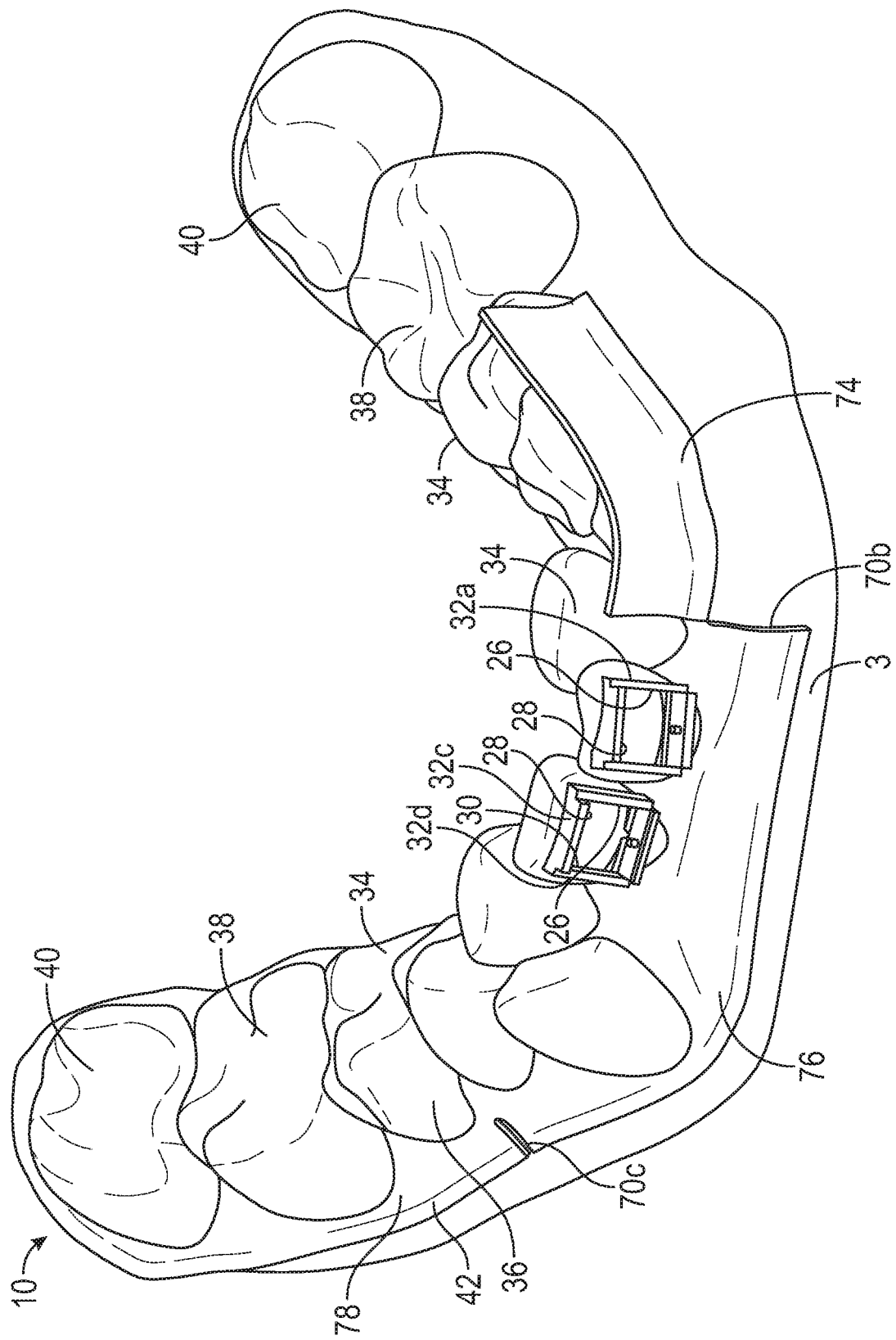
FIG. 9 is a perceptive view of the tray of FIG. 8, where another portion of the tray is being removed from the patient's mouth.

FIGS. 7, 8 and 9 are convenient for illustrating exemplary steps for removing the indirect bonding tray 10 from the patient's mouth, after the orthodontic appliances 60 are bonded to the teeth. To facilitate easy removal from the patient's dental arch 1, the indirect bonding tray 10 of the present invention also includes one or more custom engineered compliant mechanisms 70 designed into the mold body 12 at predefined locations. The compliant mechanisms 70 allow certain portions of the mold body 12 to pivot relative to each other around a planned radius. By pivoting the different portions of the mold body 12, this allows a user or orthodontist to easily remove the mold body 12 from the patient's dental arch, after one or more orthodontic appliances 60 are bonded to the surface of the teeth. During the process of removal, a portion of the mold body 12 is rotated or bent away from the teeth of the patient, while another portion may stay registered on the teeth of the patient. This creates desired locations of space between the portions of the indirect bonding tray 10 and the patient's dental arch to allow at least certain portions of the tray 10 to be removed successively, or for the entire indirect bonding tray 10 to be removed in one piece, without impacting the location or orientation of the orthodontic appliance 60 on a corresponding tooth surface.

An engineered complaint mechanism 70 is different than a naturally occurring compliant mechanism, for instance in that it includes two aspects: (1) an engineered design and directional functionality of the mechanism and (2) an engineered location of the mechanism in the indirect bonding tray 10. Both are developed strategically into the tray to facilitate flex for easy and non-disruptive removal of the tray from the patient's arch, usually after one or more orthodontic appliances are bonded to the surface of the teeth. The engineered complaint mechanisms are customized by placing them at predefined locations of a patient-specific, customized dental template. In contrast, a naturally occurring compliant mechanism 70 may exist by virtue of a thermoforming process or natural topography of the dentition in a commercially available aligner.

Suitable examples of custom-engineered compliant mechanism 70 include a hinge, a pivot, a score line, a weakened portion, an engineered line of weakness, a line of concentrated stress, a frangible portion, a perforation, a bendable element, a thinner portion, a portion with lower modulus of elasticity, or a predetermined slot, void, or gap. The compliant mechanism having one or more areas of weakness are engineered to concentrate stress and facilitate controlled bending, preferably with greater deflection resulting from lower applied forces. Another example of custom-engineered complaint mechanism 70 is breakable at a predefined location to aid in separating portions of the mold body 12 from the dental arch of the patient, after one or more orthodontic appliances are bonded to the labial surface of the teeth. For example, the mold body 12 could be made of a frangible material. In such case, the compliant mechanism itself becomes frangible and facilitates controlled breakage along engineered lines of weakness.

In using the custom-engineered complaint mechanisms, selected portions of the indirect bonding tray 10 may be removed successively, as illustrated in FIGS. 8 and 9, or almost the entire dental template may be removed in substantially one piece. Also, the selected portions may be pivoted or flexed to bend away from the teeth and then the mold body 12 may be removed from the patient's mouth in substantially one piece.

As part of the design process, described in more detail below, custom-engineered compliant mechanisms 70 are located at certain predetermined locations, and often will include designed pivot axes. The Figures illustrate certain exemplary compliant mechanisms and accompanying pivot axes. The mold body 12 illustrated includes compliant mechanisms 70a-70c designed into certain predetermined locations. Compliant mechanisms 70a-70c are all in the form of slots or slits, but could be any of the other types described above. The complaint mechanisms 70a-70c divide the mold body 12 into four different portions, which may be removed sequentially from the patient's mouth. The five portions are labeled first portion 72, second portion 74, third portion 76, and fourth portion 78.

The compliant mechanisms 70a-70c each include a pivot axis (not shown) that is generally orientated in an occluso-gingival direction. After the mold body 12 is registered on the dental arch 1, and after the orthodontic appliances 60 are bonded to the teeth through the guide apertures 20, the first portion 72 of the tray 10 may be pivoted along the axis of the complaint mechanism 70a, as illustrated in FIG. 8. In the embodiments shown, such as the one with elongated slits or perforations proximal the bracket apertures, the gingival portion of the appliance may need to pivot 45 degrees or more and stay in this position for the dental template 10 to clear the orthodontic brackets 60. The orthodontist may then break away first portion 72 from the second portion 74 remaining on the patient's teeth, or simply disengage the first portion from the dental arch.

Next, the gingival region 42 of the mold body 12 of the second portion 74 may be pivoted relative to the occlusal region 38 of the mold body 12 along the pivot axes of compliant mechanisms 70a-70b. As illustrated in FIG. 9, the gingival region 42 between compliant mechanism 70a and complaint mechanism 70b is pivoted away from the dental arch 1, thus exposing the gingival side of the orthodontic appliances. This motion assists in removing both the labial portion 36 and lingual mold portion 34, of the tray 10 from the patient's dental arch.

In another embodiment (not shown), the compliant mechanism could include a pivot axis that is generally mesial-distal, and the mold body includes a mesial region and a distal region. In this embodiment, the mesial region is pivotable relative to a portion of the distal region at the custom-engineered compliant mechanism. The dental template may include one or more hinges at predetermine locations proximate the guide apertures, allowing a portion of the mold body to be pivotable about at least one of the hinges.

Next, the orthodontist may remove the third portion 76 of the tray 10 by pivoting the gingival region 42 relative to the occlusal region 38 of the mold body 12 along the compliant mechanisms 70b and 70c. Again, this motion assists in removing both the labial portion 36 and lingual mold portion 34 of the dental template 10 from the patient's dental arch but does not disturb the orthodontic appliances 60 bonded thereto.

Lastly, the orthodontist may pivot the fourth portion 78 of the dental template 10 along the axis of the complaint mechanism 70c, similar to how the first portion 72 was pivoted in FIG. 8. The portion 78 will then break away from the tray 10 remaining on the patient's teeth. This assists in removing the remaining labial and lingual mold bodies 36, 34 of the tray 10 from the patient's dental arch. Any of the portions 72-78 may be removed in any order determined by the orthodontist.

After the dental template is removed from the teeth, the orthodontic appliances 60 are now bonded to respective teeth at their intended, predetermined locations, as illustrated in FIG. 6A. The indirect bonding tray 10 provides a way to efficiently indirect bond orthodontic appliances 60 to a patient's mouth in optimized locations.

Although FIG. 6B illustrates orthodontic appliances 60 bonded to all teeth, it is possible that the orthodontist may omit certain posterior teeth from treatment. In such cases, the indirect bonding tray 10 would be designed to include the teeth intended for treatment and would use other teeth for anchorage, for example the molars or bicuspids.

Indirect bonding tray 10 of the present invention are preferably made from elastomeric materials. For example, the mold body 12 of the tray 10 could be made of a flexible silicone rubber, a low-modulus polyurethane or silicone RTV. With these materials, the tray including guide apertures 20 could deform to a high percentage elongation to assist in clearing the orthodontic appliances 60 without exerting enough tensile or shear forces to de-bond the brackets. The guide apertures 20 may also be deformable to aid in the removal of the indirect bonding tray 10.

In some embodiments, indirect bonding tray 10 of the present invention are made from an elastic polymeric material that generally conforms to a patient's teeth, and may be transparent, translucent, or opaque. In some embodiments, the tray 10 is a clear or substantially transparent polymeric material that may include, for example, one or more of amorphous thermoplastic polymers, semi-crystalline thermoplastic polymers and transparent thermoplastic polymers chosen from polycarbonate, thermoplastic polyurethane, acrylic, polysulfone, polyprolylene, polypropylene/ethylene copolymer, cyclic olefin polymer/copolymer, poly-4-methyl-1-pentene or polyester/polycarbonate copolymer, styrenic polymeric materials, polyamide, polymethylpentene, polyetheretherketone and combinations thereof. In another embodiment, the tray 10 may be chosen from clear or substantially transparent semi-crystalline thermoplastic, crystalline thermoplastics and composites, such as polyamide, polyethylene terephthalate. polybutylene terephthalate, polyester/polycarbonate copolymer, polyolefin, cyclic olefin polymer, styrenic copolymer, polyetherimide, polyetheretherketone, polyethersulfone, polytrimethylene terephthalate, and mixtures and combinations thereof. In some embodiments, the tray 10 is a polymeric material chosen from polyethylene terephthalate, polyethylene terephthalate glycol, poly cyclohexylenedimethylene terephthalate glycol, and mixtures and combinations thereof. One example of a commercially available material suitable as the elastic polymeric material, which is not intended to be limiting, is DURAN 3413, a clear sheet of polyethylene terephthalate, glycol modified (PETg), available from Scheu Dental Tech of Iserlohn, Germany. Another example of suitable material is ethylene vinyl acetate.

If the indirect bonding tray 10 is made of a material having high modulus and low elongation, such as three-dimensional printed methacrylate resin, then the template is frangible and will break at the compliant mechanisms 70, such as a score line, a weakened portion, or an engineered line of weakness. If the tray 10 is made of a material having a relatively lower modulus and higher elongation, such as thermoformed PETG, then the template will bend at the compliant mechanisms 70, but remain intact with the remaining of the template while allowing the portion to be removed from the patient's mouth. To form certain complaint mechanisms 70a-c, excess material could be trimmed away after thermoforming, such as with a five-axis CNC mill, a LASER cutter or a water knife. The guide apertures 20 could be cut similarly.

The indirect bonding tray 10 may be manufactured by a three-dimensional (3D) printing process (e.g. additive manufacturing), such as stereolithography (SLA). Alternatively, a suitable method of manufacture is thermoforming the dental indirect bonding tray, followed by computer numerical control (CNC) trimming, or robotic trimming, of excess material, or to cut apertures, slots, perforations, or the like.

Figure 10:
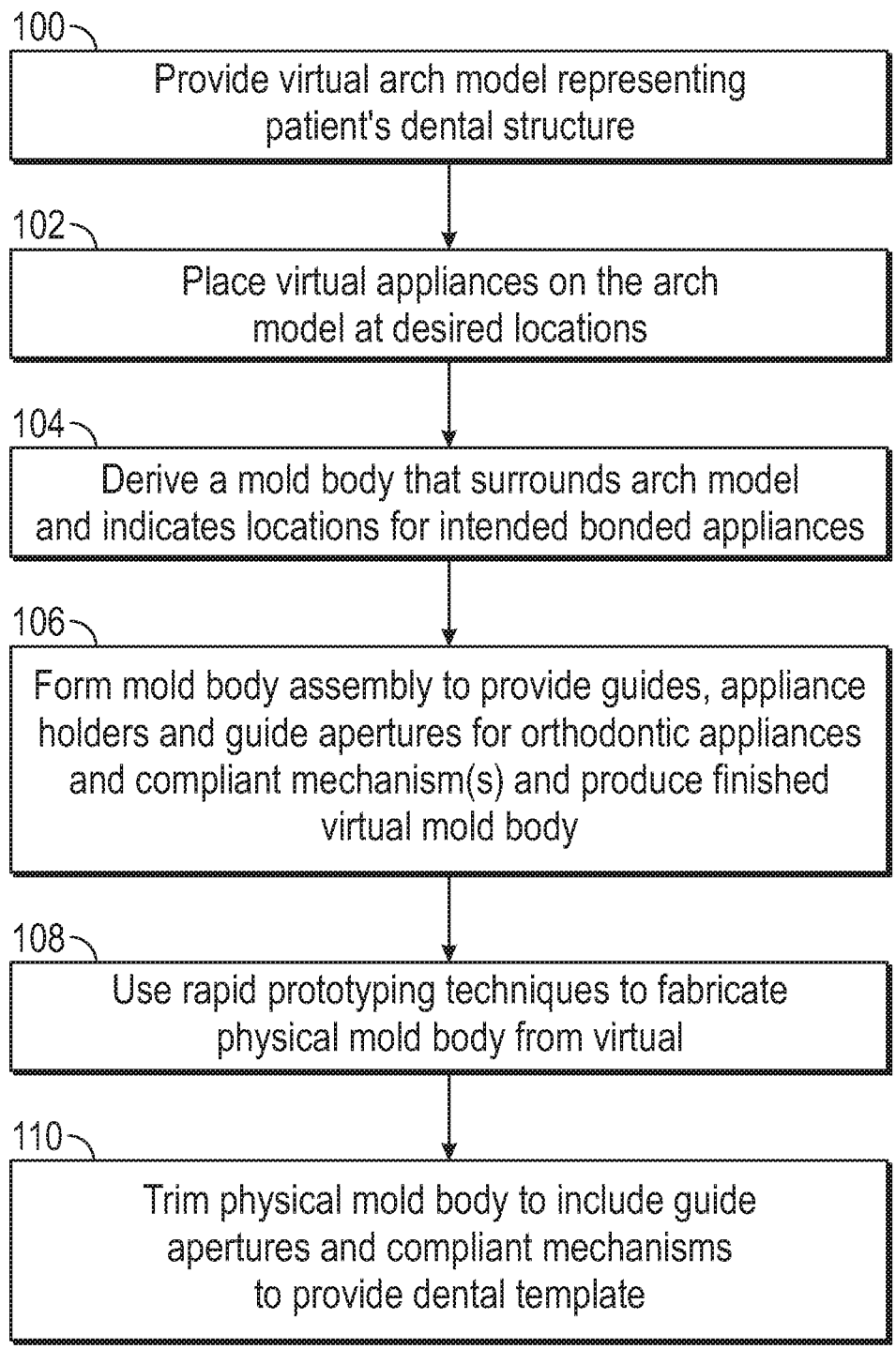
FIG. 10 is a schematic block diagram describing a workflow used to make an indirect bonding tray according to exemplary embodiments of the present invention.

FIG. 10 is a schematic block diagram describing a workflow used to make an indirect bonding tray for indirect bonding orthodontic appliances on a patient's teeth according to exemplary embodiments of the present invention. The first block, designated by the numeral 100, represents the step of providing a virtual model of a patient's dental structure, as illustrated in FIG. 1. This virtual model of the patient's dental structure can be obtained using digital data provided using a hand-held intra-oral scanner such as the intra-oral scanner commercially available from 3M Company (St. Paul) as 3M™ True Definition Scanner. Alternatively, other intra-oral scanners or intra-oral contact probes may be used. As another option, the digital data may be obtained by scanning an impression or other negative replica of the patient's dental structure. As still another option, the virtual model representing the patient's dental structure may be obtained by scanning a positive replica of such dental structure or by using a contact probe on the positive replica. The positive replica used for scanning may be made by pouring a casting material (such as plaster of Paris or epoxy resin) into an impression of the patient's teeth and allowing the casting material to cure. If scanning is used, any suitable scanning technique may then be used to obtain the virtual arch model representing the patient's dental structure, including X-ray scanning, laser scanning, computed tomography (CT), magnetic resonance imaging, or blue light scanning, such as GOM ATOS 3D scanner.

Additional steps may be used to further refine the digital data before rendering the virtual arch model of the patient's dental structure. For example, the digital data representing the virtual model may be additionally filtered or processed by removing erroneous data points. For example, STL (stereolithography) data files representing a tooth surface that include a data point significantly outside the normal expected geometrical relationship of adjacent data points could be fixed by STL-handling software to remove the erroneous data points. In addition, tooth data points that are missing could be added by software that manipulates STL files to create realistic, smoothly curved tooth shapes. In some embodiments, data processing is carried out before conversion of the data to an STL file.

The workflow then proceeds to block 102, where one or more virtual orthodontic appliances are placed at desired locations on the teeth of arch model to form a composite model. For one embodiment of the present invention, the orthodontic appliances are represented by labial brackets. In an alternative embodiment, the orthodontic appliances are represented by lingual brackets. In yet another embodiment, the orthodontic appliances are represented by attachments for improving the engagement of Clear Tray Aligners (CTAs). Regardless, the orthodontic appliances including their overall shape and corresponding bases for attachment to the teeth are directly provided in the form of an STL file, or other digital image, by the appliance manufacturer. One suitable appliance manufacturer is 3M Company based in St. Paul. 3M Company provides ceramic orthodontic brackets commercially as 3M™ Clarity™ brackets, metal brackets commercially as Victory Series™ brackets, Unitek™ brackets, and SmartClip™ self-ligating brackets, and brackets having uncured adhesive on the bracket bases commercially available as APC™ II brackets, APC™ PLUS brackets, and APC™ Flash-Free brackets. Alternatively, the digital images representing the orthodontic appliances may be provided by scanning the physical appliance, or appliances, themselves. Preferably, the orthodontic appliances are exact virtual replicas of the physical appliances to be bonded to the teeth of the patient.

The desired locations for the virtual orthodontic appliances on the teeth of the virtual dental arch model of the patient can be determined in any of a number of ways. In one example, the treating professional manually selects and places the virtual orthodontic appliances directly on the model using the local computer. In some embodiments, the modeling software treats each appliance and each tooth as a separate object within the 3D environment and fixes the position of each orthodontic appliance within the 3D space relative to a coordinate system associated with the tooth of the corresponding appliance. The modeling software can then, for example, virtually connect the virtual orthodontic appliances to a virtual arch wire selected by the practitioner and compute the final positions of the teeth based on the positions of the orthodontic appliances and the selected arch wire. The modeling software can then display the virtual teeth in their final occlusion for review by the treating professional.

If the treating professional is not entirely satisfied with the final predicted positions of the teeth, the treating professional may use the modeling software to manipulate one or more of the virtual orthodontic appliances relative to the virtual teeth. Based on these adjustments, the modeling software can again virtually connect the virtual orthodontic appliances to the virtual arch wire, for example, to simulate the movement of teeth to new final positions. The new final positions of the teeth, determined by the positions of corresponding virtual appliances, are then computed and displayed for review. These steps can be repeated as many times as desired until the treating professional is satisfied with the final positions of the teeth as represented by the modeling software. As an alternative to moving appliances, the treating professional may instead use the modeling software to define the desired positions of teeth, and have the modeling software determine the suitable locations to place the virtual orthodontic appliances in order to move the teeth to those desired positions. Examples of virtual orthodontic treatment are disclosed in issued U.S. Pat. No. 6,739,869 (Kopelman et al.), U.S. Pat. No. 7,354,268 (Raby et al.) and U.S. Pat. No. 7,993,133 (Cinader, Jr. et al.), all of which are hereby incorporated.

As another option, the step in block 102 may be carried out by a technician at a location remote from the treating professional's office. For example, a technician at the orthodontic appliance manufacturer's facility may use the modeling software to place orthodontic appliances on the arch model based on standards or guidelines from an orthodontic treatment philosophy, such as for example that of Drs. MacLaughlin, Bennett, and Trevisi. These standards or guidelines for appliance placement may be specific to each tooth in model, and call out the position of the arch wire slot (an occlusal-gingival height, for example) with respect to the clinical crown of each tooth. The technician may also place orthodontic appliances in accordance with particular instructions provided by the treating professional. Once the technician is satisfied with the orthodontic appliance positions and the resulting finished positions of the teeth, the model, together with the data representing the positions of orthodontic appliances, are transmitted to the treating professional for review. The treating professional can then either approve the technician's appliance placement positions or reposition the orthodontic appliances as desired.

As yet another option, the local computer can automatically suggest locations of orthodontic appliances on the teeth to the treating professional. Again, these proposed orthodontic appliance locations are optionally based upon an orthodontic treatment philosophy or other known standards or guidelines in the art. Examples of automatically placing virtual brackets on teeth are described in issued U.S. Pat. No. 7,210,929 (Raby et al.), U.S. Pat. No. 8,517,727 (Raby et al.) and U.S. Pat. No. 7,940,258 (Stark et al.), all of which are hereby incorporated by reference. As before, the treating professional has the opportunity to review the computer-proposed locations of orthodontic appliances and can either approve the placement positions or reposition the orthodontic appliances as desired.

Next, block 104 illustrates the derivation of a mold body that a patient-specific, customized fit with a plurality of teeth in the patient's dental arch and the desired locations for the selected orthodontic appliances when bonded to the teeth. In this embodiment, the derivation proceeds by defining a guidance line that extends across at least a portion of the arch. The guidance line follows a curved path that is generally parallel to the facial surfaces of the teeth and generally lies in an occlusal plane. However, one or more guidance lines may also be defined which traverse the occlusal or lingual surfaces of the arch. In one computer-assisted embodiment, the guidance lines are defined by tracing a line segment that connects the facial-most edges of teeth as viewed from the occlusal direction, offsetting the line segment outwardly towards the facial direction by a certain distance and then applying a smoothing operation to the line segment. The process in block 104 continues by defining a series of fitted arcs, each of which extends over the lingual, occlusal, and facial surfaces of the virtual model of the teeth in the dental arch and intersects each guidance line in a generally perpendicular relationship such that each fitted arc passes over without contacting the model. In this example, each fitted arc is generally semi-circular in shape and begins at a location lingual relative to the teeth and terminates at a location facial to the teeth.

The outer surface of the model represents the exterior surface of the mold body and may be formed by fitting a surface to the set of fitted arcs. In some embodiments, the outer surface is an open-ended shell that completely covers the occlusal, lingual, and facial sides of the assembly that includes the model, desired locations for the appliances intended to be later bonded through the guide apertures, and desired custom-engineered compliant mechanisms, as discussed above, which will aid in the removal of the mold body from the dental arch. Optionally, a surface smoothing operation is subsequently executed on the outer surface. Then, a virtual mold body is derived using the outer surface. When virtually aligned with the virtual arch model, the mold body surrounds both the teeth, provides optimized locations for the orthodontic appliances to be later mounted through guide apertures, and provides locations and shapes of the custom-engineered complaint mechanism to be used later in removal of the mold body from the dental arch, after the orthodontic appliances are bonded to the surface of the teeth.

Next, there is a virtual subtraction of the specific patient's dental structure model to produce a virtual mold body precursor. The mold body precursor includes the mold body, which now has a shell-like configuration and further includes locations for the guide apertures formed by the bases of the negative virtual imprints of the selected orthodontic appliances and locations for the custom-engineered appliances and further includes the positioning portions and orthodontic appliance holders In block 106, a finished virtual indirect bonding tray is produced by molding and trimming a mold body to create a gingival edge, guide apertures shaped to allow placement of the intended orthodontic appliances on the surfaces of the selected teeth, orthodontic positioning portions and appliance holders, and optional custom-engineered compliant mechanisms that will aid in removal of the mold body from the dental arch, after one or more of the orthodontic appliances are bonded to the surface of the teeth.

It is noted that the above steps in blocks 102-106 represent just one possible sequence of steps used to produce the finished virtual indirect bonding tray. Further steps or substitutions of the above steps may be used to accomplish the same result. Moreover, the steps described need not be executed in the exact order shown above.

Block 108 shows the fabrication of a physical mold body from the virtual mold using additive manufacturing techniques. As used herein, "additive manufacturing" is a process that takes virtual designs from Computer Aided Design (CAD) or other modeling software, transforms them into a series of thin, virtual, horizontal cross-sections and then re-constructs each cross-section in physical space, one after the next until the model is finished. For example, an additive manufacturing machine may read in data from a CAD drawing and lay down successive layers of liquid, powder, or sheet material, in order to build up the physical model. By automatically aligning and fusing together a series of cross-sections, the virtual model and physical model can correspond almost identically. Advantageously, the layer-by-layer aspect of rapid prototyping allows the creation of nearly any shape or geometric feature. As an added benefit, rapid prototyping also provides flexibility to fabricate articles that include two or more interpenetrating components with substantially different material properties.

Particular examples of "additive manufacturing" techniques include, but are not limited to, three-dimensional (3D) printing, selective area laser deposition or Selective Laser Sintering (SLS), electrophoretic deposition, robocasting, Fused Deposition Modeling (FDM), Laminated Object Manufacturing (LOM), stereolithography (SLA) and photo-stereolithography. Issued U.S. Pat. Nos. 5,340,656, 5,490,882, 5,204,055, 5,518,680, 5,490,962, 5,387,380, 5,700,289, 5,518,680, and 4,672,032 describe examples of suitable additive manufacturing techniques (also known historically and in certain applications as "rapid prototyping" techniques). Particularly suitable additive manufacturing machines include the VIPER brand SLA system from 3D Systems (Rock Hill, SC), EDEN brand 500V printer from Objet Geometries Ltd. (Rehovot, ISRAEL), and ProMaker MovingLight 3D technology DLP printer from Prodways (Les Mureaux, France).

Once fabricated, the resulting physical mold body will be the finished indirect bonding tray 10 of the present invention, including all designed-in guide apertures 20, guides 18 including both holders 44 and positioning portions 45, and one or more of the custom-engineered compliant mechanisms for a specific patient. The indirect bonding tray 10 may then be used by the orthodontist to direct bond the selected orthodontic appliances onto the patient's teeth, as discussed in detail above.

Alternatively, the workflow could include first the step of additive manufacturing the physical mold body in block 108 followed thereafter by trimming the resulting physical mold body to include the prior designed guide apertures and compliant mechanisms as represented by block 110. One example of a suitable trimming tool is a Roland DWX-50 5-Axis Dental Milling Machine, available from Roland DGA Corporation (Irvine, California).

The complete disclosures of the patents, patent documents, and publications cited herein are incorporated by reference in their entirety as if each were individually incorporated. A number of other variations, modifications and additions are also possible without departing from the spirit of the invention. Accordingly, the invention should not be deemed limited to the specific embodiments described above, but instead only by a fair scope of the claims that follow and their equivalents.

The invention claimed is:

1. An indirect bonding tray, the bonding tray comprising:
a mold body for a patient-specific, customized fit with a plurality of teeth in a dental arch of a patient, the mold body having an exterior surface and an interior surface opposite the exterior surface;
one or more guide apertures configured to permit placement of an orthodontic appliance on a surface of a tooth at a predetermined location aligned with the one or more guide apertures, when the mold body is registered on the dental arch;
one or more guides extending from the exterior surface, wherein each guide is aligned with at least one guide aperture of the one or more guide apertures; and
one or more appliance holders, wherein each appliance holder is in slidable engagement with at least one guide of the one or more guides,
wherein one or more of the at least one guide or at least one appliance holder of the one or more appliance holders comprise at least one breakable positioning portion, the at least one breakable positioning portion configured to maintain the at least one appliance holder in a first position when the at least one breakable positioning portion is in an unbroken state, and wherein the at least one breakable positioning portion is configured to be broken to permit the at least one appliance holder to move from the first position to a second position when the at least one breakable positioning portion is in a broken state.

2. The indirect bonding tray of claim 1, wherein the patient-specific, customized fit corresponds to labial and lingual surfaces of the plurality of teeth.

3. The indirect bonding tray of claim 1, wherein the at least one guide is configured to permit placement of a base of the orthodontic appliance in a direction perpendicular to a labial surface of the tooth aligned with the at least one guide aperture.

4. The indirect bonding tray of claim 1, wherein the one or more guide apertures include a substantially enclosed perimeter.

5. The indirect bonding tray of claim 1, further including an orthodontic appliance positioned within each of the one or more appliance holders.

6. The indirect bonding tray of claim 5, wherein the at least one appliance holder and the orthodontic appliance together are in a slidable engagement with the at least one guide between the first position and the second position, wherein in the first position, the at least one appliance holder and the orthodontic appliance are positioned away from the tooth, and in the second position, a base of the orthodontic appliance is in contact with the surface of the tooth.

7. The indirect bonding tray of claim 5, wherein the orthodontic appliance includes a layer of adhesive on a base of the orthodontic appliance.

8. The indirect bonding tray of claim 1, comprising a custom-engineered compliant mechanism where a portion of the mold body is pivotable relative to a portion of the mold body.

9. The indirect bonding tray of claim 8, wherein the custom-engineered compliant mechanism is a hinge, a pivot, a score line, a weakened portion, an engineered line of weakness, a line of concentrated stress, a frangible portion, a perforation, a bendable element, a thinner portion, a portion with lower modulus of strength, or a predetermined slot, void or gap, wherein the compliant mechanism is located at a predefined location or locations on the indirect bonding tray.

10. The indirect bonding tray of claim 8, wherein the custom-engineered compliant mechanism is breakable at a predefined location to aid in separating portions of the mold body from the dental arch after one or more orthodontic appliances are bonded to a labial surface of the plurality of teeth.

11. The indirect bonding tray of claim 1, wherein the interior surface of the mold body is configured to engage all teeth of the dental arch, and wherein the interior surface includes a plurality of contour portions, each contour portion of the plurality of contour portions matching a contour of a corresponding labial tooth surface.

12. The indirect bonding tray of claim 1, wherein in the first position the at least one appliance holder is in contact with the at least one breakable positioning portion.

13. The indirect bonding tray of claim 1, wherein the at least one appliance holder includes one or more slots for engaging with the at least one breakable positioning portion.

14. The indirect bonding tray of claim 1, wherein at least one guide includes one or more slots for engaging with the at least one breakable positioning portion.

15. The indirect bonding tray of claim 1, wherein the one or more appliance holders include a plurality of appliance holders, and wherein the indirect bonding tray further comprises a pressure plate to push the plurality of appliance holders down their corresponding guides substantially simultaneously.

16. The indirect bonding tray of claim 15, wherein the pressure plate holds the orthodontic appliance in place next to a corresponding tooth surface until the orthodontic appliance is bonding to the corresponding tooth surface.

17. A method of designing an indirect bonding tray, the method comprising:
receiving, by one or more processors, three-dimensional scan data of a tooth structure of a patient; and
designing, by the one or more processors, a custom indirect bonding tray for indirect bonding orthodontic appliances based on the three-dimensional scan data, and a desired tooth structure of a plurality of teeth to receive an orthodontic appliance bonded to the patient, wherein the indirect bonding tray comprises:
a mold body for a patient-specific, customized fit with a plurality of teeth in a dental arch of the patient, the mold body having an exterior surface and an interior surface opposite the exterior surface, wherein the mold body is manufactured by three-dimensional printing;
one or more guides extending from the exterior surface, the one or more guides including a guide aperture configured to permit placement of an orthodontic appliance on a surface of a tooth at a predetermined location aligned with the guide aperture, when the mold body is registered on the dental arch; and
a plurality of appliance holders configured to retain an orthodontic appliance, wherein each appliance holder is in slidable engagement with at least one guide of the one or more guides,
wherein one or more of the at least one guide or at least one appliance holder of the one or more appliance holders comprise at least one breakable positioning portion, the at least one breakable positioning portion configured to maintain the at least one appliance holder in a first position when the at least one breakable positioning portion is in an unbroken state, and wherein the at least one breakable positioning portion is configured to be broken to permit the at least one appliance holder to move from the first position to a second position when the at least one breakable positioning portion is in a broken state.

18. A kit, comprising:
an indirect bonding tray, the bonding tray comprising:
- a mold body for a patient-specific, customized fit with a plurality of teeth in a dental arch of a patient, the mold body having an exterior surface and an interior surface opposite the exterior surface;
- one or more guides extending from the exterior surface, the one or more guides including a guide aperture configured to permit placement of an orthodontic appliance on a surface of a tooth at a predetermined location aligned with the guide aperture, when the mold body is registered on the dental arch; and
- one or more orthodontic appliance holders, wherein each orthodontic appliance holder is in slidable engagement with at least one guide of the one or more guides,
  wherein one or more of the at least one guide or at least one orthodontic appliance holder of the one or more orthodontic appliance holders comprise at least one breakable positioning portion, the at least one breakable positioning portion configured to maintain the at least one orthodontic appliance holder in a first position when the at least one breakable positioning portion is in an unbroken state, and wherein the at least one breakable positioning portion is configured to be broken to permit the at least one orthodontic appliance holder to move from the first position to a second position when the at least one breakable positioning portion is in a broken state.

19. The kit of claim 18, wherein the at least one orthodontic appliance holder and the orthodontic appliance are in a slidable engagement with the at least one guide between the first position and the second position, wherein in the first position the at least one orthodontic appliance holder is in contact with the at least one breakable positioning portion.

* * * * *